(12) United States Patent
Wang et al.

(10) Patent No.: US 12,302,310 B2
(45) Date of Patent: May 13, 2025

(54) CANCELLATION OF DIFFERENT SIDELINK CHANNELS

(71) Applicant: QUALCOMM Incorporated, San Diego, CA (US)

(72) Inventors: Xiaojie Wang, Hillsborough, NJ (US); Xiaoxia Zhang, San Diego, CA (US); Piyush Gupta, Bridgewater, NJ (US); Jing Sun, San Diego, CA (US); Junyi Li, Fairless Hills, PA (US); Sony Akkarakaran, Poway, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/305,776

(22) Filed: Jul. 14, 2021

(65) Prior Publication Data

US 2023/0019948 A1 Jan. 19, 2023

(51) Int. Cl.
*H04W 72/1263* (2023.01)
*H04L 1/1812* (2023.01)
*H04L 27/26* (2006.01)
*H04W 56/00* (2009.01)

(52) U.S. Cl.
CPC ....... *H04W 72/1263* (2013.01); *H04L 1/1812* (2013.01); *H04L 27/2607* (2013.01); *H04W 56/001* (2013.01)

(58) Field of Classification Search
None
See application file for complete search history.

(56) References Cited

U.S. PATENT DOCUMENTS

| | | | | |
|---|---|---|---|---|
| 2020/0196255 A1* | 6/2020 | Cheng | | H04L 5/0092 |
| 2020/0359375 A1* | 11/2020 | Hwang | | H04L 1/1854 |
| 2021/0006318 A1* | 1/2021 | Kim | | H04W 72/20 |
| 2021/0028891 A1* | 1/2021 | Zhou | | H04L 1/1864 |
| 2021/0099994 A1* | 4/2021 | Park | | H04L 1/1861 |
| 2021/0144582 A1* | 5/2021 | Yi | | H04W 28/0278 |
| 2021/0212106 A1* | 7/2021 | Farag | | H04W 72/23 |
| 2021/0250913 A1* | 8/2021 | Ganesan | | H04W 76/14 |
| 2021/0307032 A1* | 9/2021 | Osawa | | H04W 72/1263 |
| 2021/0345360 A1* | 11/2021 | Yeo | | H04W 72/1215 |
| 2021/0385822 A1* | 12/2021 | Chae | | H04W 72/0453 |
| 2022/0006569 A1* | 1/2022 | Lee | | H04W 72/02 |
| 2022/0007403 A1* | 1/2022 | Li | | H04W 72/20 |
| 2022/0046604 A1* | 2/2022 | Zhang | | H04L 5/0037 |
| 2022/0141866 A1* | 5/2022 | Liu | | H04L 5/0012 370/329 |

(Continued)

*Primary Examiner* — Gregory B Sefcheck
*Assistant Examiner* — Suk Jin Kang
(74) *Attorney, Agent, or Firm* — Harrity & Harrity, LLP

(57) ABSTRACT

Various aspects of the present disclosure generally relate to wireless communication. In some aspects, a user equipment (UE) may receive a sidelink cancellation indication that indicates a set of resources in which to cancel sidelink communications, wherein the set of resources overlaps with at least one of a physical sidelink feedback channel (PSFCH), a gap symbol, or a sidelink synchronization signal block (S-SSB). The UE may perform one or more sidelink cancellation actions associated with the at least one of the PSFCH, the gap symbol, or the S-SSB. Numerous other aspects are described.

30 Claims, 13 Drawing Sheets

(56) References Cited

U.S. PATENT DOCUMENTS

| | | | |
|---|---|---|---|
| 2022/0167315 A1* | 5/2022 | Park | H04W 72/0446 |
| 2022/0174682 A1* | 6/2022 | Li | H04W 72/56 |
| 2022/0232575 A1* | 7/2022 | Lee | H04L 1/18 |
| 2022/0248454 A1* | 8/2022 | Lee | H04W 28/0278 |
| 2022/0287086 A1* | 9/2022 | Hwang | H04W 72/02 |
| 2022/0287128 A1* | 9/2022 | Shin | H04W 76/19 |
| 2022/0312438 A1* | 9/2022 | Yi | H04W 72/1263 |
| 2022/0321191 A1* | 10/2022 | Kim | H04B 7/0639 |
| 2022/0338172 A1* | 10/2022 | Yoshioka | H04W 72/0446 |
| 2022/0386355 A1* | 12/2022 | Yi | H04W 72/23 |
| 2023/0007628 A1* | 1/2023 | Yoshioka | H04W 72/0453 |
| 2023/0023231 A1* | 1/2023 | Chae | H04W 72/0446 |
| 2023/0124812 A1* | 4/2023 | Wong | H04W 72/0446 370/329 |
| 2023/0171761 A1* | 6/2023 | Salim | H04W 72/563 370/329 |
| 2023/0269706 A1* | 8/2023 | Yoshioka | H04L 5/0055 |
| 2023/0284257 A1* | 9/2023 | Hui | H04W 72/563 370/329 |
| 2023/0292346 A1* | 9/2023 | Hui | H04L 5/0058 |
| 2024/0121782 A1* | 4/2024 | Chae | H04W 72/0446 |

\* cited by examiner

CANCELLATION OF DIFFERENT SIDELINK CHANNELS

FIELD OF THE DISCLOSURE

Aspects of the present disclosure generally relate to wireless communication and to techniques and apparatuses for cancellation of different sidelink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive a sidelink cancellation indication that indicates a set of resources in which to cancel sidelink communications, wherein the set of resources overlaps with at least one of a physical sidelink feedback channel (PSFCH), a gap symbol, or a sidelink synchronization signal block (S-SSB). The one or more processors may be configured to perform one or more sidelink cancellation actions associated with the at least one of the PSFCH, the gap symbol, or the S-SSB.

Some aspects described herein relate to a method of wireless communication performed by a UE. The method may include receiving a sidelink cancellation indication that indicates a set of resources in which to cancel sidelink communications, wherein the set of resources overlaps with at least one of a PSFCH, a gap symbol, or an S-SSB. The method may include performing one or more sidelink cancellation actions associated with the at least one of the PSFCH, the gap symbol, or the S-SSB.

Some aspects described herein relate to a non-transitory computer-readable medium that stores a set of instructions for wireless communication by a UE. The set of instructions, when executed by one or more processors of the UE, may cause the UE to receive a sidelink cancellation indication that indicates a set of resources in which to cancel sidelink communications, wherein the set of resources overlaps with at least one of a PSFCH, a gap symbol, or an S-SSB. The set of instructions, when executed by one or more processors of the UE, may cause the UE to perform one or more sidelink cancellation actions associated with the at least one of the PSFCH, the gap symbol, or the S-SSB.

Some aspects described herein relate to an apparatus for wireless communication. The apparatus may include means for receiving a sidelink cancellation indication that indicates a set of resources in which to cancel sidelink communications, wherein the set of resources overlaps with at least one of a PSFCH, a gap symbol, or an S-SSB. The apparatus may include means for performing one or more sidelink cancellation actions associated with the at least one of the PSFCH, the gap symbol, or the S-SSB.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
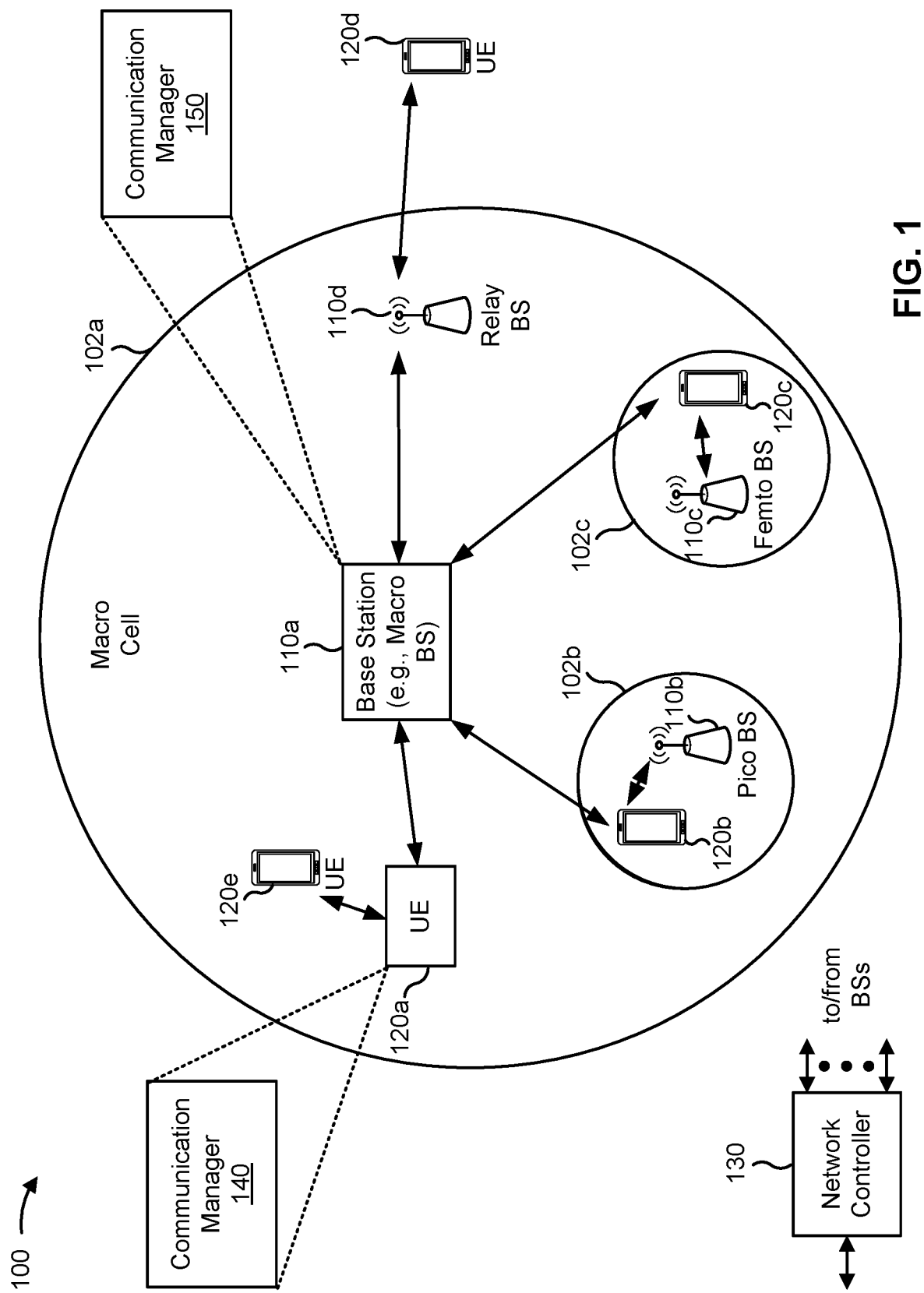
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a sidelink cancellation indication (SLCI) that indicates a set of resources in which to cancel sidelink communications, wherein the set of resources overlaps with at least one of a physical sidelink feedback channel (PSFCH), a gap symbol, or a sidelink synchronization signal block (S-SSB); and perform one or more sidelink cancellation actions associated with the at least one of the PSFCH, the gap symbol, or the S-SSB. Additionally, or alternatively, the communication manager 140 may perform one or more other operations described herein.

In some aspects, the base station 110 may include a communication manager 150. As described in more detail elsewhere herein, the communication manager 150 may transmit, to a first UE, an SLCI that indicates a set of resources in which to cancel sidelink communications, wherein the set of resources overlaps with at least one of a PSFCH, a gap symbol, or an S-SSB; and transmit, to a second UE, downlink control information (DCI) that allocates the set of resources for transmission of at least one of a sidelink communication or an uplink communication by the second UE. Additionally, or alternatively, the communication manager 150 may perform one or more other operations described herein.

As indicated above, FIG. 1 is provided as an example. Other examples may differ from what is described with regard to FIG. 1.

Figure 2:
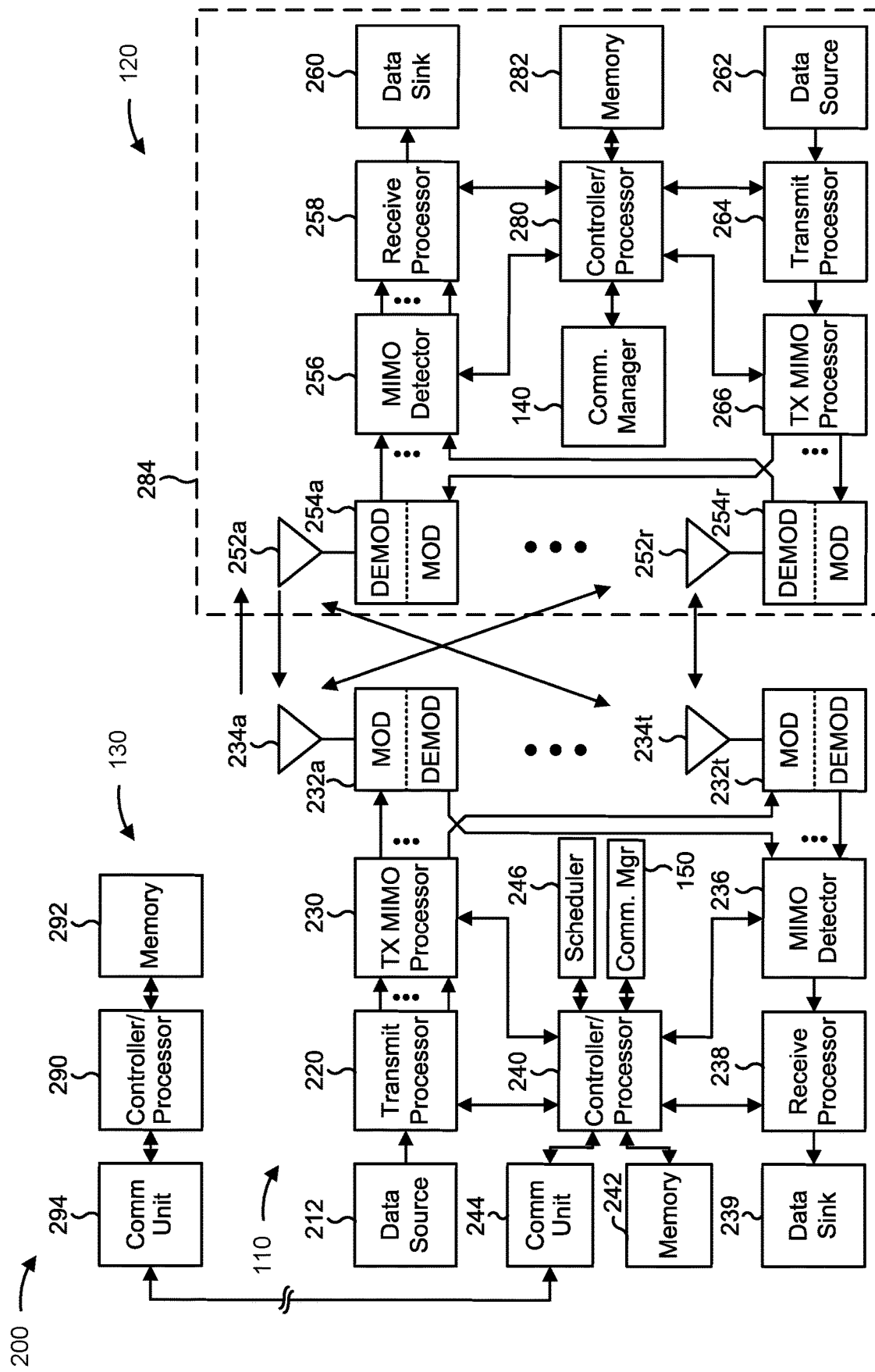
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the base station 110, the controller/processor 280 of the UE 120, and/or any other component(s) of FIG. 2 may perform one or more techniques associated with cancellation of different sidelink channels, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving an SLCI that indicates a set of resources in which to cancel sidelink communications, wherein the set of resources overlaps with at least one of a PSFCH, a gap symbol, or an S-SSB; and/or means for performing one or more sidelink cancellation actions associated with the at least one of the PSFCH, the gap symbol, or the S-SSB. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a first UE, an SLCI that indicates a set of resources in which to cancel sidelink communications, wherein the set of resources overlaps with at least one of a PSFCH, a gap symbol, or an S-SSB; and/or means for transmitting, to a second UE, DCI that allocates the set of resources for transmission of at least one of a sidelink communication or an uplink communication by the second UE. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
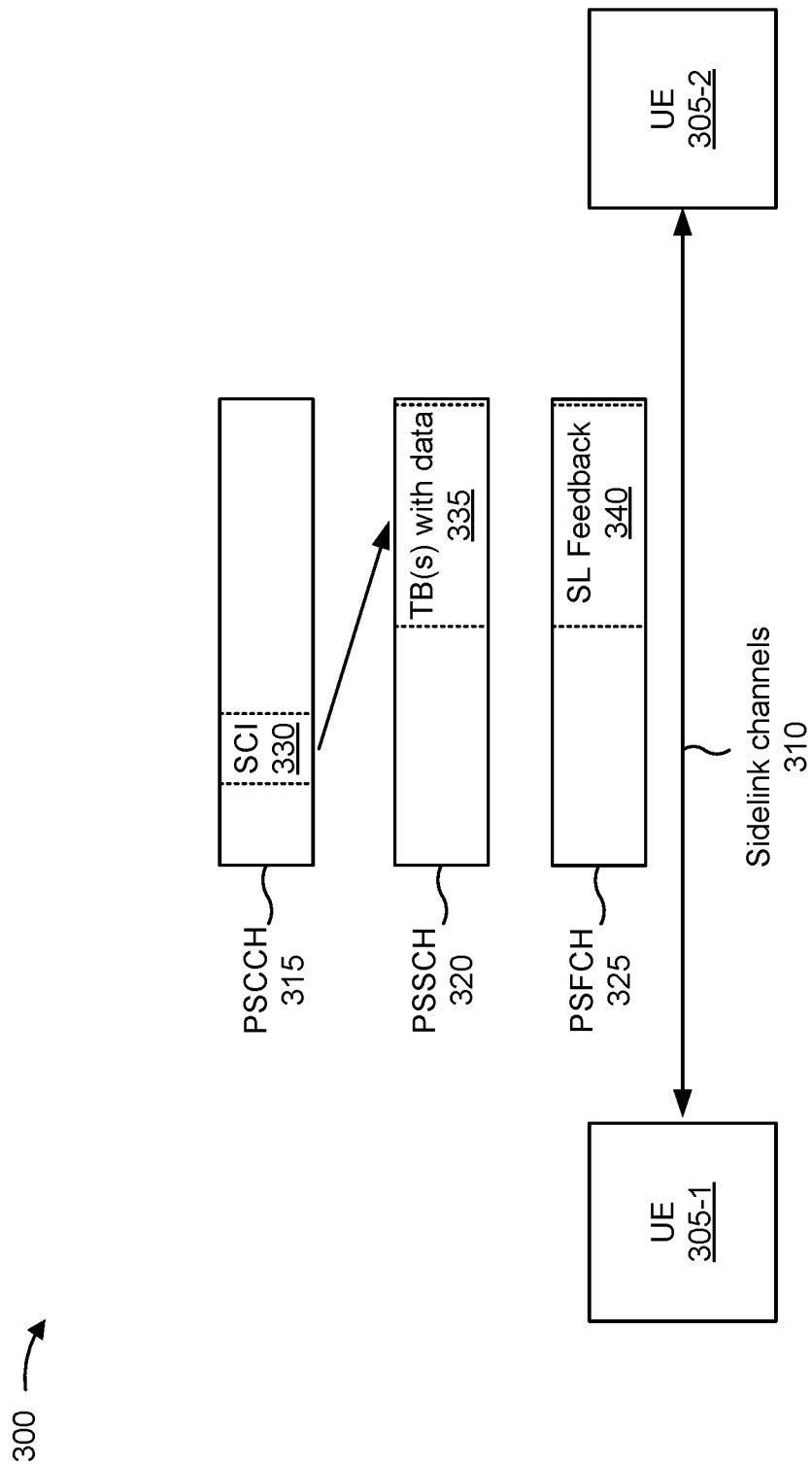
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some examples, the UEs 305 (e.g., UE 305-1 and/or UE 305-2) may correspond to one or more other UEs described elsewhere herein, such as UE 120. In some examples, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a PSFCH 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some examples, the one or more sidelink channels 310 may use resource pools. For example, a scheduling assignment (e.g., included in SCI 330) may be transmitted in sub-channels using specific resource blocks (RBs) across time. In some examples, data transmissions (e.g., on the PSSCH 320) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 305 may operate in a transmission mode (e.g., Mode 1) in which a base station allocates resources for sidelink communications between UEs 305. In some examples, a UE 305 may operate using a transmission mode (e.g., Mode 2) in which resource selection and/or scheduling is autonomously performed by the UE 305 (e.g., rather than a base station 110). In some examples, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of RBs that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more RBs to be used for the upcoming sidelink transmission on the PSSCH 320 (e.g., for TBs 335), one or more subframes to be used for the upcoming sidelink transmission, and/or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
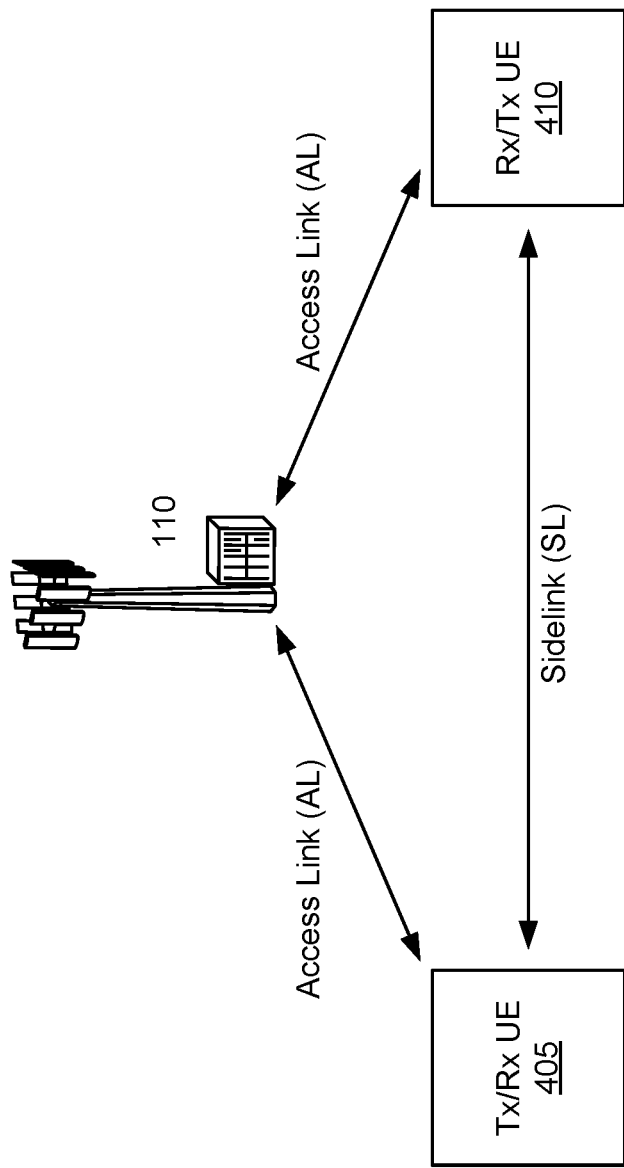
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
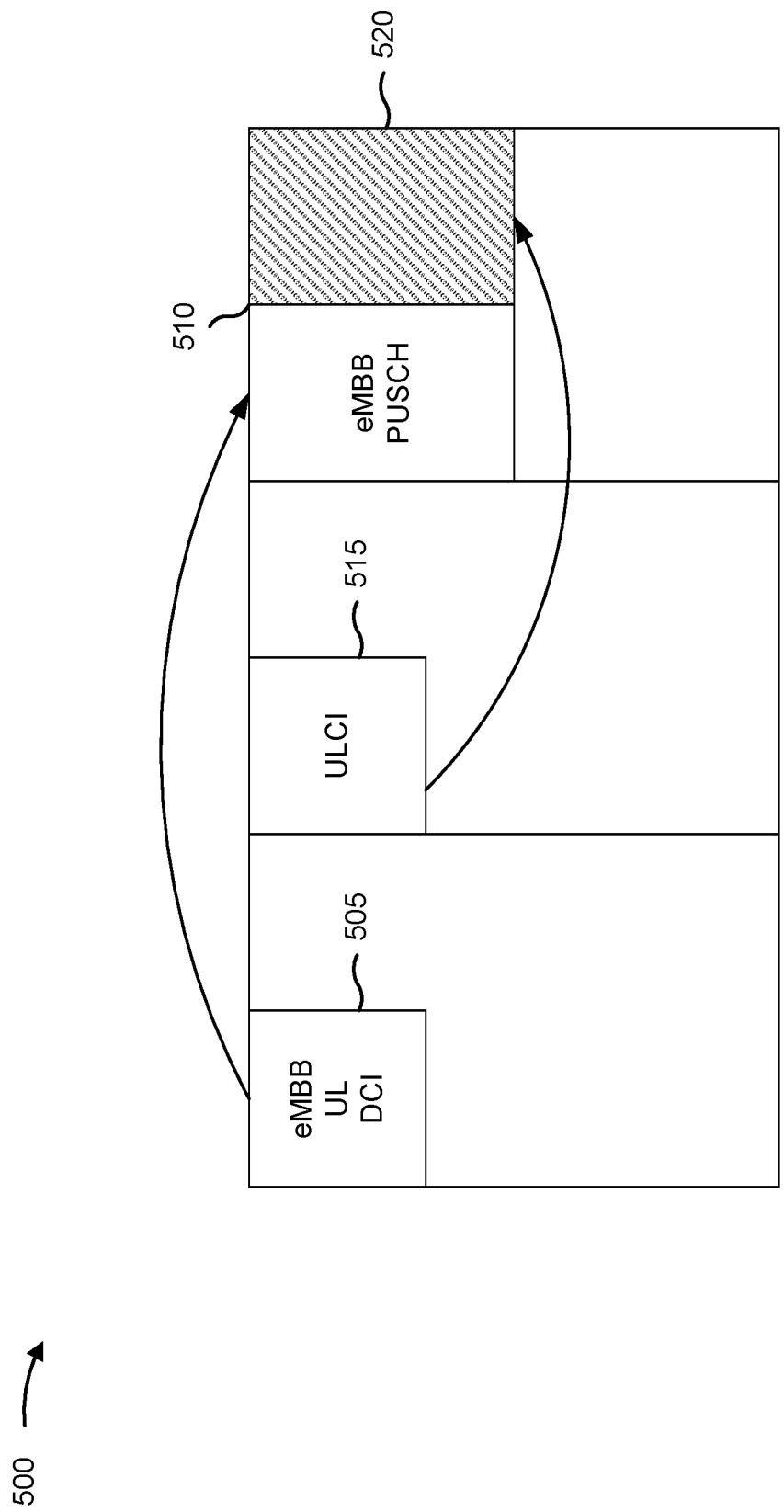
FIG. 5 is a diagram illustrating an example of an uplink cancellation indication (ULCI), in accordance with the present disclosure.

FIG. 5 is a diagram illustrating an example 500 of an uplink cancellation indication (ULCI), in accordance with the present disclosure.

A ULCI is an indication that cancels a previously scheduled resource for an uplink (e.g., PUSCH) transmission for a UE. The ULCI may be used to support uplink transmissions of traffic with different priorities (e.g., enhance mobile broadband (eMBB) traffic and ultra-reliable low-latency communication (URLLC) traffic) in a wireless network. For example, a base station may use a ULCI to preempt a scheduled PUSCH transmission by a low priority (e.g., eMBB) UE in a resource with a PUSCH transmission by a high priority (e.g., URLLC) UE. As a result, latency of high priority (e.g., URLLC) uplink traffic may be improved.

As shown in FIG. 5, a base station may transmit, to an eMBB UE, DCI 505 that includes an uplink grant for the eMBB UE. The DCI 505 may include scheduling information that schedules PUSCH resources 510 for a PUSCH communication by the eMBB UE. For example, the PUSCH 510 may include time and frequency resources (e.g., RBs) allocated for the eMBB UE to transmit the PUSCH communication to the base station. The base station, prior to the eMBB UE transmitting the PUSCH communication on the allocated PUSCH resources 510, may transmit a ULCI 515 to the eMBB UE. The ULCI may cancel one or more resources 520 of the allocated PUSCH resources 510 for the scheduled PUSCH communication by the eMBB UE. In some examples, the ULCI may be included in DCI format 2_4 (DCI 2_4). For example, the base station may transmit the ULCI to the eMBB UE in group common PDCCH (GC-PDCCH) DCI 2_4 using a cancellation indication radio network temporary identifier (CI-RNTI). The payload of the DCI 2_4 may indicate which time and frequency resources (e.g., which RBs) 520 are being canceled. The eMBB, in connection with receiving the ULCI 515, may cancel PUSCH communications scheduled on the resources 520 identified by the ULCI 515. The base station may then allocate the canceled resources for a PUSCH communication from a high priority (e.g., URLLC) UE.

A ULCI may only apply to resources allocated for PUSCH transmissions (e.g., including repetitions) and sounding reference signal (SRS) transmissions. In some examples, such as in a case in which an uplinkCancellationPriority parameter is provided, a ULCI may only cancel low priority (e.g., eMBB) PUSCH transmissions.

As indicated above, FIG. 5 is provided as an example. Other examples may differ from what is described with respect to FIG. 5.

Figure 6:
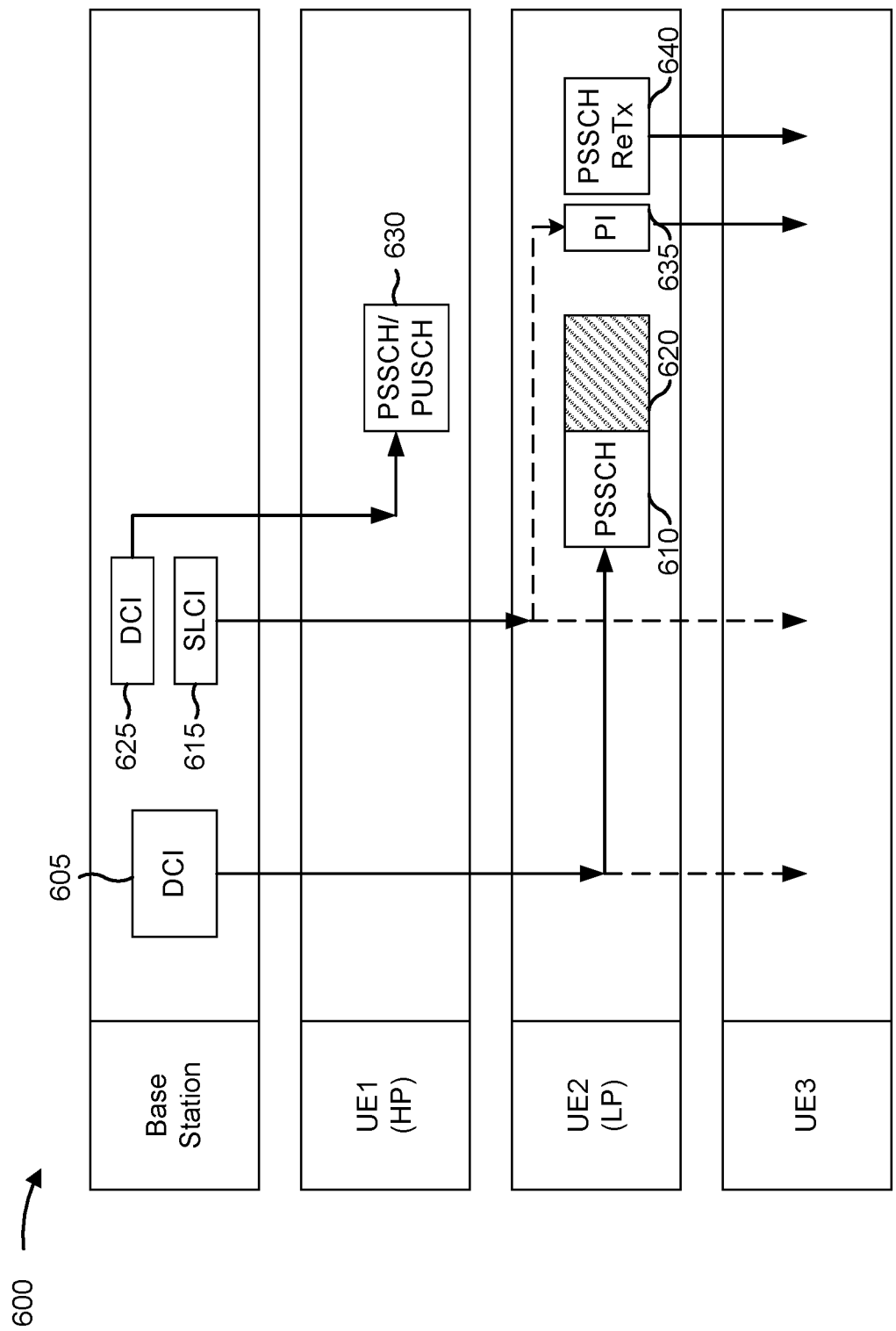
FIG. 6 is a diagram illustrating an example of a sidelink cancellation indication (SLCI), in accordance with the present disclosure.

FIG. 6 is a diagram illustrating an example 600 of an SLCI, in accordance with the present disclosure.

In a sidelink transmission mode (e.g., Mode 1) in which a base station allocates resources for sidelink communications between UEs, the base station may indicate scheduled resources for sidelink communications via DCI format 3_0 (DCI 3_0). In some examples, a UE may transmit sidelink communications (e.g., PSSCH/PSCCH) via uplink resources indicated in the DCI 3_0 received from the base station. However, a base station may not be able to use a ULCI (e.g., DCI 2_4) to cancel a scheduled sidelink communication (e.g., PSSCH/PSCCH). This may limit the base station's flexibility in scheduling high priority (e.g., URLLC) traffic if low priority (e.g., eMBB) sidelink traffic cannot be canceled. In some examples, an SLCI may be used to cancel PSSCH and/or PSCCH communications. An SLCI is an indication that cancels a previously scheduled resource for a sidelink communication for a UE.

As shown in FIG. 6, example 600 includes a base station, a first UE (UE1), a second UE (UE2), and a third UE (UE3). UE1 may be a high priority UE that transmits high priority (e.g., URLLC) traffic, and UE2 may be a low priority UE that transmits low priority (e.g., eMBB) traffic. As shown in FIG. 6, the base station may transmit, to UE2, DCI 605 that schedules a sidelink communication for UE2. For example, the DCI 605 may schedule a PSSCH communication to be transmitted from UE2 to UE3. In some examples, the DCI 605 may be DCI 3_0 that includes scheduling information that allocates PSSCH resources 610 for the PSSCH communication. In some cases, such as in a case in which UE3 is within a coverage range of the base station, the base station may transmit the DCI 605 to UE3, as well as UE2. In some cases, such as in a case in which UE3 is not within a coverage range of the base station, UE2 may forward the DCI 605 to UE3.

As further shown in FIG. 6, the base station, prior to the UE2 transmitting the PSSCH communication to UE3 on the allocated PSSCH resources 610, may transmit an SLCI 615 to UE2. In a case in which UE3 is in a coverage range of the base station, the base station may also transmit the SLCI to UE3. The SLCI 615 may cancel one or more resources 620 of the allocated PSSCH resources 610 for the scheduled PSSCH communication from UE2 to UE3. In some cases, such as in the case in which UE3 is not within the coverage range of the base station, UE2 may forward the SLCI 615 to UE3. The SLCI 615 may be included in DCI, and the SLCI 615 may identify time and frequency resources 620, for which PSSCH/PSCCH communications are being canceled for UE2. UE2 in connection with receiving the SLCI 615, may cancel the PSSCH communication scheduled on the resources 620 identified by the SLCI 615. The base station may transmit, to UE1, DCI 625 (e.g., DCI 3_0) allocate resources 630, including the canceled resources 620 identified in the SLCI 615, for a PSSCH communication or a PUSCH communication (e.g., including URLLC traffic) to be transmitted by UE1. In some examples, the base station may transmit the SLCI 615 to UE2 based at least in part on a URLLC traffic arrival in a buffer of UE1 in order to preempt the scheduled PSSCH communication for UE2 with a PSSCH or PUSCH transmission for UE1 that includes the URLLC traffic.

UE2, in connection with receiving the SLCI 615 that cancels the one or more resources 620 of the allocated PSSCH resources 610 for the PSSCH communication, may transmit a preemption indication (PI) 635 to UE3. For example, the PI 635 may be included in SCI transmitted from UE2. The PI 635 may indicate, to UE3 (which may be out of coverage of the base station) that the scheduled PSSCH has been canceled (or preempted). In some examples, the PI 635 may also schedule PSSCH resources 640 for re-transmitting the (previously canceled/preempted) PSSCH communication from UE2 to UE3. UE2 may then transmit the PSSCH communication on the PSSCH resources 640 indicated in the PI 635.

In some examples, a base station may use an SLCI to cancel low priority sidelink (e.g., PSSCH/PSCCH) traffic for high priority uplink (e.g., PUSCH) traffic. In some examples, a base station may use an SLCI to cancel low priority sidelink (e.g., PSSCH/PSCCH) traffic for high priority sidelink traffic. In some examples, a base station may use an SLCI to cancel scheduled sidelink (e.g., PSSCH) re-transmissions. In this case, the base station may re-transmit the data from the PSSCH communication over the Uu interface (e.g., in a PDSCH communication), and the base station may cancel the scheduled sidelink re-transmission resource. As a result, the scheduling flexibility and interference coordination for high priority traffic may be improved, resulting in improved latency and reliability of high priority (e.g., URLLC) traffic.

As indicated above, FIG. 6 is provided as an example. Other examples may differ from what is described with respect to FIG. 6.

As described above in connection with FIG. 6, a base station may use an SLCI to cancel PSSCH and/or PSCCH sidelink communications, which may improve scheduling flexibility (e.g., for high priority traffic) and interference coordination. However, UE behavior has not been considered for cases in which the SLCI indicates that cancellation of any resources in an S-SSB/physical sidelink broadcast channel (PSBCH), in the PSFCH, or in a configured gap symbol in a sidelink frame structure. In such cases, a UE may not know whether to cancel a scheduled sidelink transmission, which may result in increased interference, decreased reliability for sidelink communications, and increased latency for high priority (e.g., URLLC) sidelink and/or uplink communications.

Some techniques and apparatuses described herein enable a base station to transmit, to a UE, an SLCI that indicates a set of resources in which to cancel sidelink communications. The set of resources, indicated by the SLCI, may overlap with at least one of a PSFCH, a gap symbol, or an S-SSB. The UE may receive the SLCI, and the UE may perform one or more sidelink cancellation actions associated with the at least one of the PSFCH, the gap symbol, or the S-SSB. As a result, behavior of UEs regarding which resources are to be canceled may be consistent in cases in which a set of resources indicated by the SLCI overlaps with PSFCH resources, a gap symbol, or an S-SSB. This may reduce interference, increase reliability for sidelink communications, an improve latency for high priority (e.g., URLLC) sidelink and/or uplink communications.

Figure 7:
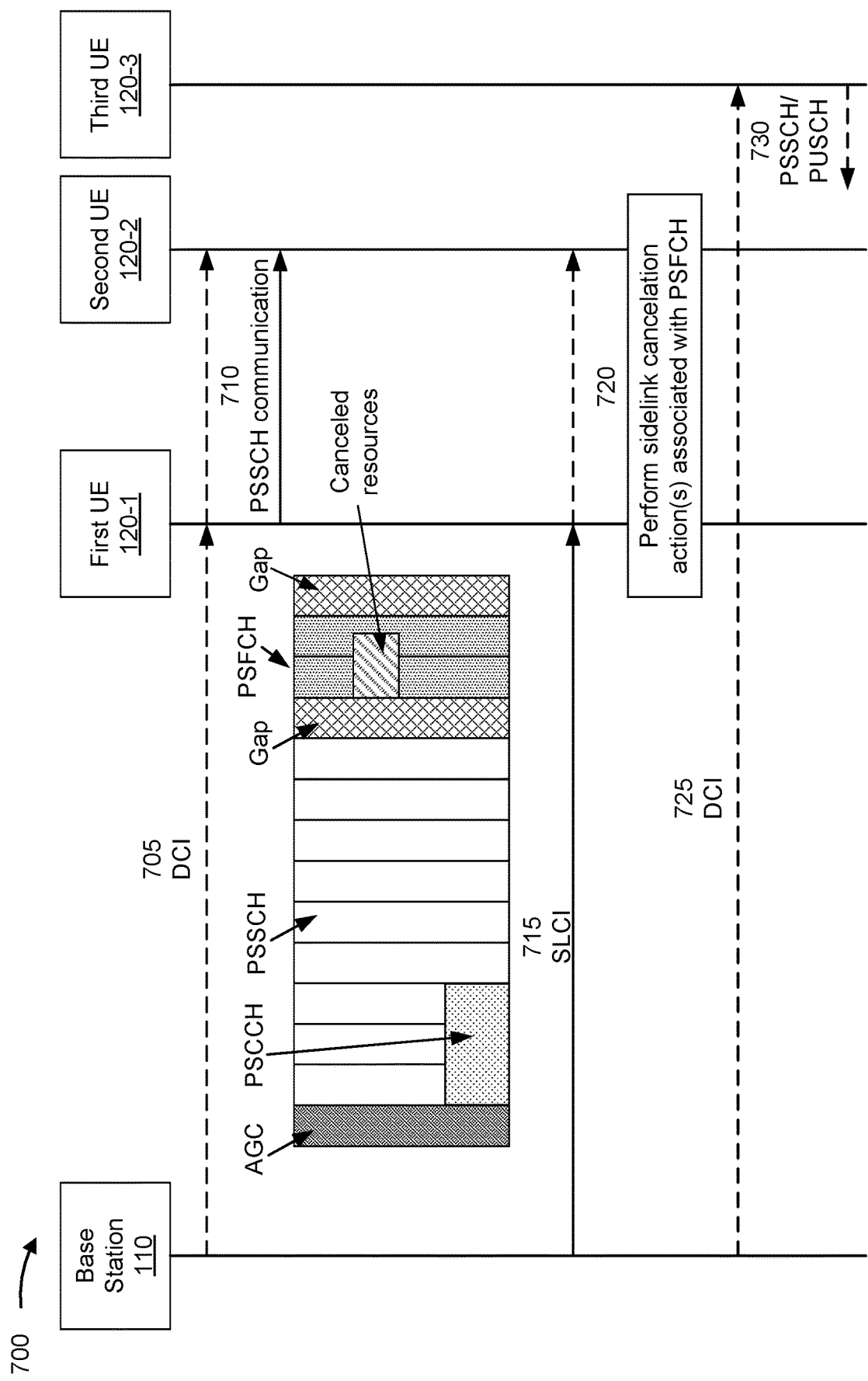
FIG. 7 is a diagram illustrating an example associated with cancellation of sidelink resources in a physical sidelink feedback channel (PSFCH), in accordance with the present disclosure.

FIG. 7 is a diagram illustrating an example 700 associated with cancellation of sidelink resources in a PSFCH, in accordance with the present disclosure. As shown in FIG. 7, example 700 includes communication between a base station 110, a first UE 120-1, a second UE 120-2, and a third UE 120-3. In some aspects, the base station 110, the first UE 120-1, the second UE 120-2, and the third UE 120-3 may be included in a wireless network, such as wireless network 100. The base station 110 and the UEs 120 may communicate via a wireless access link, which may include an uplink and a downlink (e.g., between the base station 110 and the UEs 120) and may include a sidelink (e.g., between the UEs 120).

As shown in FIG. 7, and by reference number 705, the base station 110 may transmit, to the first UE 120-1, DCI that schedules a sidelink communication for the first UE 120-1. For example, the DCI may schedule a PSSCH communication to be transmitted from the first UE 120-1 to the second UE 120-2. In some aspects, the DCI may be DCI 3_0 that includes scheduling information that identifies time and frequency resources for the first UE 120-1 to use to transmit the PSSCH communication to the second UE 120-2. In some aspects, the first UE 120-1 may forward the DCI including the scheduling information for the PSSCH communication to the second UE 120-2. For example, the first UE 120-1 may forward the DCI to the second UE 120-2 in a case in which the second UE 120-2 is out of a coverage range of the base station 110.

As further shown in FIG. 7, and by reference number 710, the first UE 120-1 may transmit the scheduled sidelink communication to the second UE 120-2. For example, the first UE 120-1 may transmit the PSSCH communication to the second UE 120-2 in the allocated resources, identified in the DCI, for the PSSCH communication. In this case, the first UE 120-1 may be the Tx UE for the sidelink (e.g., PSSCH) communication, and the second UE 120-2 may be the Rx UE for the sidelink (e.g., PSSCH) communication.

The second UE 120-2 may receive the PSSCH communication. In some aspects, based at least in part on receiving the PSSCH communication, the second UE 120-2 may identify a PSFCH resource (e.g., a resource in the PSFCH) for transmitting a HARQ feedback message (e.g., HARQ ACK/NACK) for the PSSCH communication to the first UE 120-1. For example, the HARQ feedback message may provide an acknowledgment to first UE 120-1 (e.g., the Tx UE for the PSSCH communication) that the second UE 120-2 (e.g., the Rx UE) has received and successfully decoded the PSSCH communication.

As further shown in FIG. 7, and by reference number 715, the base station 110 may transmit an SLCI to the first UE 120-1. In some aspects, the base station 110 may transmit the SLCI to the first UE 120-1 and one or more other UEs (e.g., the second UE 120-2, the third UE 120-3, and/or one or more other UEs in a coverage range of the base station 110). In some aspects, the base station 110 may include the SLCI in DCI transmitted in a PDCCH communication, such as a GC-PDCCH communication. The SLCI may indicate a set of resources in which to cancel sidelink communications. In some aspects, the SLCI may include a sequence of bits (e.g., 14 bits) that maps to a two-dimensional bit field to indicate a pattern of resources to be canceled, within a time and frequency resource region (e.g., groups of RBs at one or more different frequencies) represented by the two-dimensional bit field. The time and frequency resource region represented by the two-dimensional bit field (e.g., the time and frequency resource region, from which the set of resources to be canceled are selected) may be offset from the SLCI by a time offset value. For example, a first symbol of the time and frequency resource region may be offset from a last symbol of the DCI including the SLCI by the time offset value. In some aspects, the base station 110 may select the set of resources for which sidelink communications are to be canceled based at least in part on an arrival of high priority (e.g., URLLC) traffic in a buffer of a UE (e.g., the third UE 120-3).

As shown in FIG. 7, a frame structure for sidelink communications may include an automatic gain control (AGC) symbol, a PSCCH resources, PSSCH resources, PSFCH resources (e.g., two PSFCH symbols), and two gap symbols. The gap symbols are symbols that are not used for transmission or reception of sidelink communications. The gap symbols are configured to give UEs time to switch from transmission to reception or from reception to transmission. As used herein, "frame structure" refers to a configuration of symbols and/or other resources in a TTI (e.g., frame, subframe, slot, or the like). In some aspects, the set of resources for which sidelink communications are to be canceled may overlap with the PSFCH. For example, at least one resource in the set of resources may overlap with at least one PSFCH resource (e.g., at least one resource in a PSFCH symbol).

The first UE 120-1 may receive the SLCI from the base station 110. In some aspects, the first UE 120-1 may transmit the SLCI to the second UE 120-2. For example, the first UE 120-1 may transmit the SLCI to the second UE 120-2 in a case in which the second UE 120-2 is out of coverage (e.g., not within the coverage range) of the base station 110. In some aspects, the first UE 120-1 may broadcast the SLCI to one or more other UEs. For example, the first UE 120-1 may broadcast the SLCI (e.g., in SCI) to all sidelink UEs within a range of the first UE 120-1. In some aspects, the second UE 120-2 may be in the coverage range of the base station 110, and the second UE 120-2 may receive the SLCI from the base station 110. In some aspects, the second UE 120-2 may be out of coverage of the base station 110, and the second UE 120-2 may receive the SLCI from the first UE 120-1.

As further shown in FIG. 7, and by reference number 720, the first UE 120-1 and the second UE 120-2 may each perform one or more sidelink cancellation actions associated with the PSFCH.

In some aspects, based at least in part on the set of resources overlapping with the PSFCH, the second UE 120-2 may defer transmitting the HARQ feedback message scheduled for the PSFCH to a next available occurrence of the PSFCH, and the first UE 120-1 may defer receiving the HARQ feedback message scheduled for the PSFCH to the next available occurrence of the PSFCH. In some aspects, the first UE 120-1 (e.g., the Tx UE for the PSSCH communication for which the HARQ feedback message is scheduled) may determine whether the set of resources identified in the SLCI overlaps with the PSFCH resource in which the HARQ feedback message is scheduled. Based at least in part on the set of resources identified in the SLCI overlapping with the PSFCH resource, the first UE 120-1 may defer monitoring for the HARQ feedback message until the next available occurrence of the PSFCH. In this case, the first UE 120-1 may transmit, to the second UE 120-2 (e.g., the Rx UE for the PSSCH communication for which the HARQ feedback message is scheduled) a PI that indicates, to the second UE 120-2, the cancellation of the HARQ feedback message in the scheduled PSFCH resource. For example, the first UE 120-1 may transmit the PI to the second UE 120-2 in SCI. In some aspects, the PI may indicate, to the second UE 120-2, to defer the HARQ feedback message to the next available PSFCH occurrence. In some aspects, the PI may include scheduling information that schedules a deferred PSFCH resource (e.g., in the next available occurrence of the PSFCH) for the second UE 120-2 to use to transmit the HARQ feedback message.

In some aspects, the second UE 120-2 may receive the SLCI (e.g., from the base station 110 or from the first UE 120-1), and the second UE 120-2 may defer the transmission of the HARQ feedback message to the next available PSFCH opportunity based at least in part on receiving the SLCI (e.g., based at least in part on a determination that the set of resources identified in the SLCI overlaps with the scheduled PSFCH resource for the HARQ feedback message). In some aspects, the second UE 120-2 may cancel the transmission of the HARQ feedback message in the scheduled PSFCH resource based at least in part on receiving the PI from the first UE 120-1. In this case, the second UE 120-2 may defer the transmission of the HARQ feedback message based at least in part on the PI. For example, the second UE 120-2 may transmit the HARQ feedback message to the first UE 120-1 in a next available occurrence of the PSFCH based on an indication in the PI, or the second UE 120-2 may transmit the HARQ feedback message to the first UE 120-1 in a deferred PSFCH resource indicated in the PI.

In some aspects, based at least in part on the set of resources identified in the SLCI overlapping with the PSFCH, the first UE 120-1 and the second UE 120-2 may ignore the SLCI for one or more resources, in the set of resources, that overlap with the PSFCH. For example, the base station 110 may not be permitted to cancel sidelink communications (e.g., HARQ feedback messages) in PSFCH resources, and in a case in which the SLCI identifies PSFCH resources to be canceled, HARQ feedback messages may still be transmitted using the PSFCH resources. In this case, if the set of resources identified in the SLCI overlaps with the scheduled PSFCH resource for the HARQ feedback message to be transmitted from the second UE 120-2 to the first UE 120-1, the second UE 120-2 may transmit the HARQ feedback message on the scheduled PSFCH resource, and the first UE 120-1 may receive the HARQ feedback message on the scheduled PSFCH resource.

As shown in FIG. 7, the sidelink frame structure may include a first PSFCH symbol and a second PSFCH symbol. In some aspects, the set of resources identified in the SLCI may overlap with only one of the PSFCH symbols. For example, the set of resources may overlap with the first PSFCH symbol, and the set of resources may not overlap with the second PSFCH symbol. In this case, PSFCH transmission and reception may be performed on the non-overlapping PSFCH symbol (e.g., the second PSFCH symbol). For example, in a case in which the scheduled PSFCH resource for the HARQ feedback message is in the non-overlapping PSFCH symbol (e.g., the second symbol), the second UE 120-2 may transmit the HARQ feedback message to the first UE 120-1 on the scheduled PSFCH resource in the non-overlapping PSFCH symbol. In a case in which the set of resources overlaps with only one of the PSFCH symbols (e.g., the first symbol) and the scheduled PSFCH symbol for the HARQ feedback message is on the overlapping symbol (e.g., the first symbol), the second UE 120-2 and the first UE 120-1 may use a PSFCH resource on the non-overlapping PSFCH symbol (e.g., the second symbol) to transmit and receive the HARQ feedback message. In some aspects, the base station 110 may be permitted to cancel (e.g., include in the set of resources indicated in the SLCI) one or more PSFCH resources on the first PSFCH symbol or one or more PSFCH resources on the second PSFCH symbol, but not PSFCH resources on both symbols.

As further shown in FIG. 7, and by reference number 725, the base station 110 may transmit, to the third UE 120-3 DCI that schedules a sidelink (e.g., PSSCH) communication or an uplink (e.g., PUSCH) communication to be transmitted by the third UE 120-3. The DCI may allocate one or more resources in the set of resources identified in the SLCI for the third UE 120-3 to use to transmit the PSSCH communication or the PUSCH communication. For example, the base station 110 may preempt the scheduled sidelink transmission (e.g., the PSFCH transmission/HARQ feedback message) between the second UE 120-2 and the first UE 120-1 by re-allocating the resource(s) for the scheduled sidelink transmission to be used transmitting the PSSCH communication or PUSCH communication by the third UE 120-3. In this case, the third UE 120-3 may be a high priority (e.g., URLLC) UE, and the first UE 120-1 and the second UE 120-2 may be low priority (e.g., eMBB) UEs.

As further shown in FIG. 7, and by reference number 730, the third UE 120-3 may transmit the sidelink (e.g., PSSCH) communication or the uplink (e.g., PUSCH) communication scheduled by the DCI received from the base station 110. For example, the third UE 120-3 may transmit the PSSCH communication or the PUSCH communication using the resources allocated by the DCI, including one or more resources in the set of resources identified in the SLCI.

As described above, the base station 110 may transmit, to the first UE 120-1 and/or the second UE 120-2, an SLCI that indicates a set of resources in which to cancel sidelink communications. The set of resources, indicated by the SLCI, may overlap with a PSFCH. The first UE 120-1 and/or the second UE 120-2 may receive the SLCI, and the first UE 120-1 and/or the second UE 120-2 may perform one or more sidelink cancellation actions associated with the PSFCH. As a result, the behavior of the UEs regarding which resources are to be canceled may be consistent in a case in which the set of resources indicated by the SLCI overlaps with PSFCH resources. This may reduce interference, increase reliability for sidelink communications, an improve latency for high priority (e.g., URLLC) sidelink and/or uplink communications.

As indicated above, FIG. 7 is provided as an example. Other examples may differ from what is described with respect to FIG. 7.

Figure 8:
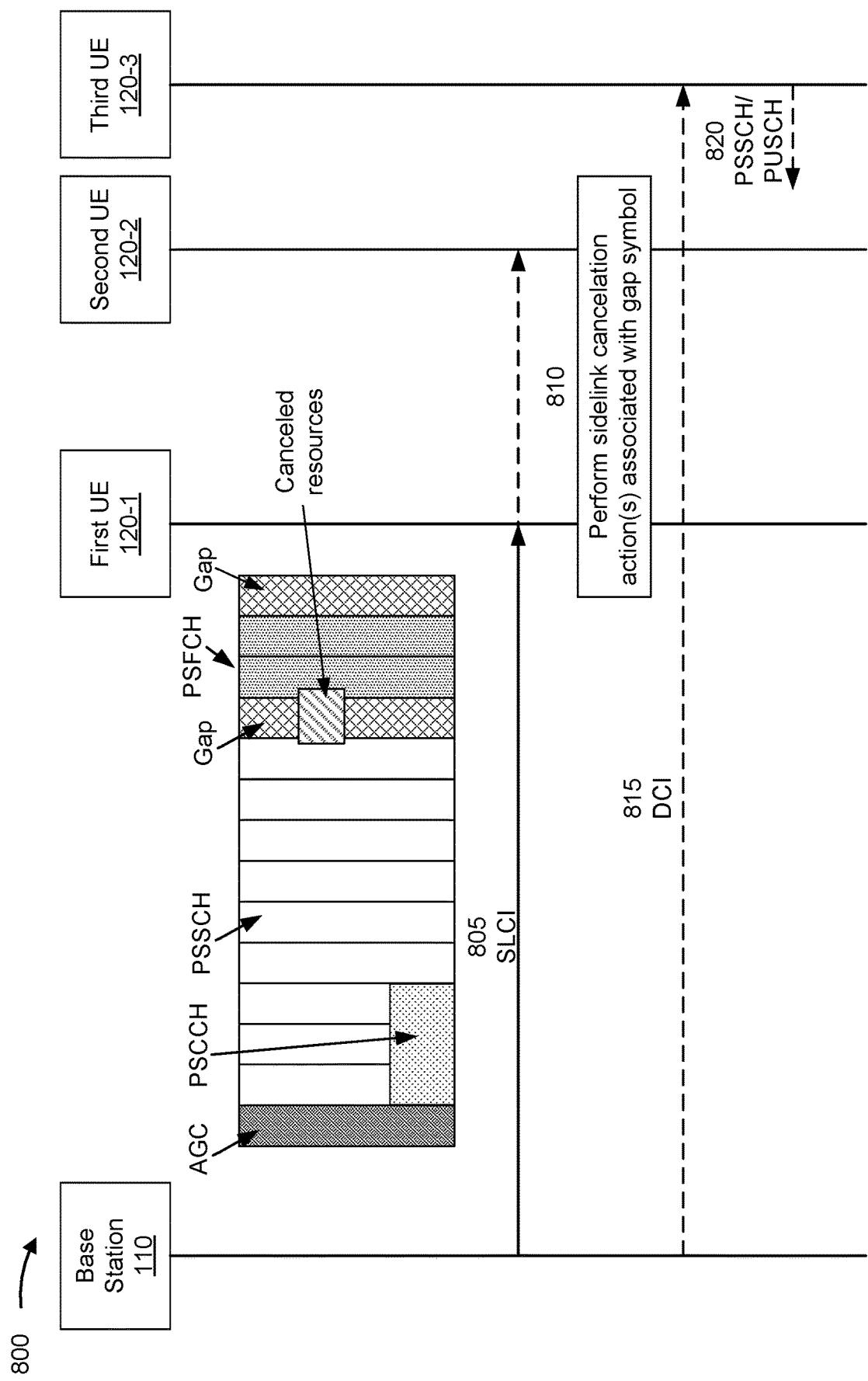
FIG. 8 is a diagram illustrating an example associated with cancellation of sidelink resources in a gap symbol, in accordance with the present disclosure.

FIG. 8 is a diagram illustrating an example 800 associated with cancellation of sidelink resources in a gap symbol, in accordance with the present disclosure. As shown in FIG. 8, example 800 includes communication between a base station 110, a first UE 120-1, a second UE 120-2, and a third UE 120-3. In some aspects, the base station 110, the first UE 120-1, the second UE 120-2, and the third UE 120-3 may be included in a wireless network, such as wireless network 100. The base station 110 and the UEs 120 may communicate via a wireless access link, which may include an uplink and a downlink (e.g., between the base station 110 and the UEs 120) and may include a sidelink (e.g., between the UEs 120).

As shown in FIG. 8, and by reference number 805, the base station 110 may transmit an SLCI to the first UE 120-1. In some aspects, the base station 110 may transmit the SLCI to the first UE 120-1 and one or more other UEs (e.g., the second UE 120-2, the third UE 120-3, and/or one or more other UEs in a coverage range of the base station 110). In some aspects, the base station 110 may include the SLCI in DCI transmitted in a PDCCH communication, such as a GC-PDCCH communication. The SLCI may indicate a set of resources in which to cancel sidelink communications. In some aspects, the SLCI may include a sequence of bits (e.g., 14 bits) that maps to a two-dimensional bit field to indicate a pattern of resources to be canceled, within a time and frequency resource region (e.g., groups of RBs at one or more different frequencies) represented by the two-dimensional bit field. The time and frequency resource region represented by the two-dimensional bit field (e.g., the time and frequency resource region, from which the set of resources to be canceled are selected) may be offset from the SLCI by a time offset value. For example, a first symbol of the time and frequency resource region may be offset from a last symbol of the DCI including the SLCI by the time offset value. In some aspects, the base station 110 may select the set of resources for which sidelink communications are to be canceled based at least in part on an arrival of high priority (e.g., URLLC) traffic in a buffer of a UE (e.g., the third UE 120-3).

As shown in FIG. 8, a frame structure for sidelink communications may include an AGC symbol, a PSCCH resources, PSSCH resources, PSFCH resources, and two gap symbols. The gap symbols are symbols that are not used for transmission or reception of sidelink communications. The gap symbols may be configured to give UEs time to switch from transmission to reception or from reception to transmission. For example, a first gap symbol may be located between the PSSCH symbols and the PSFCH symbols, and a second gap symbols may be located after the PSFCH symbols. As shown in FIG. 8, in some aspects, the set of resources for which sidelink communications are to be canceled may overlap with a configured gap symbol in the sidelink frame structure. For example, at least one resource in the set of resources may overlap with at least one resource (e.g., on at least one frequency) in the gap symbol.

The first UE 120-1 may receive the SLCI from the base station 110. In some aspects, the first UE 120-1 may transmit the SLCI to the second UE 120-2. For example, the first UE 120-1 may transmit the SLCI to the second UE 120-2 in a case in which the second UE 120-2 is out of coverage (e.g., not within the coverage range) of the base station 110. In some aspects, the first UE 120-1 may broadcast the SLCI to one or more other UEs. For example, the first UE 120-1 may broadcast the SLCI (e.g., in SCI) to all sidelink UEs within a range of the first UE 120-1. In some aspects, the second UE 120-2 may be in the coverage range of the base station 110, and the second UE 120-2 may receive the SLCI from the base station 110. In some aspects, the second UE 120-2 may be out of coverage of the base station 110, and the second UE 120-2 may receive the SLCI from the first UE 120-1.

As further shown in FIG. 8, and by reference number 810, the first UE 120-1 and the second UE 120-2 may each perform one or more sidelink cancellation actions associated with the gap symbol.

In some aspects, based at least in part on the set of resources overlapping with the gap symbol, the first UE 120-1 and the second UE 120-2 may ignore the SLCI for one or more resources, in the set of resources, that overlap with the gap symbol. In this case, no sidelink communications are scheduled on the gap symbol, and the first UE 120-1 and the second UE 120-2 may transmit and receive sidelink communications on resources in the symbols preceding or subsequent to the gap symbol, as long as the resources in the symbols preceding or subsequent to the gap symbol do not overlap with the set of resources indicated in the SLCI.

The set of resources identified in the SLCI may overlap with the gap symbol on one or more frequencies (referred to herein as "overlapping frequencies"). In some aspects, based at least in part on the set of resources overlapping with the gap symbol, the first UE 120-1 and/or the second UE 120-2 may cancel sidelink transmission (and/or reception) on the one or more overlapping frequencies in the symbol preceding the gap symbol. This may reduce interference, due to imperfect synchronization between sidelink and uplink signals, for an uplink transmission transmitted using a resource that overlaps with the gap symbol. In some aspects, a subchannel (e.g., including multiple RBs) for sidelink communications may be considered to be on an overlapping frequency if at least one RB associated with an overlapping frequency is included within that subchannel. In this case, a sidelink communication on the subchannel in the symbol preceding the gap symbol may be canceled. For example, in a case in which a sidelink communication is scheduled to be transmitted from the first UE 120-1 (e.g., the Tx UE) to the second UE 120-2 (e.g., the Rx UE) on an overlapping frequency in the symbol preceding the gap symbol, the first UE 120-1 may cancel the transmission of the scheduled sidelink communication. In this case, the first UE 120-1 may transmit, to the second UE 120-2, a PI that indicates, to the second UE 120-2 the cancellation of the scheduled sidelink communication. In some aspects, the PI may include scheduling information that schedules a re-transmission of the canceled sidelink communication. For example, the PI may indicate a deferred resource for re-transmitting the canceled sidelink communication. In some aspects, the second UE 120-2 (e.g., the Rx UE), based at least in part on receiving the SLCI from the base station 110 or from first UE 120-1 or based at least in part on receiving the PI from the first UE 120-1, may cancel monitoring for the scheduled sidelink communication. In this case, the second UE 120-2 may monitor for and receive the re-transmission of the sidelink communication in the deferred resource indicated in the PI.

In some aspects, based at least in part on the set of resources overlapping with the gap symbol, the first UE 120-1 and/or the second UE 120-2 may cancel sidelink transmission (and/or reception) on the one or more overlapping frequencies in the symbol subsequent the gap symbol. This may reduce interference, due to imperfect synchronization between sidelink and uplink signals, for an uplink transmission transmitted using a resource that overlaps with the gap symbol. In some aspects, a subchannel (e.g., including multiple RBs) for sidelink communications may be considered to be on an overlapping frequency if at least one RB associated with an overlapping frequency is included within that subchannel. In this case, a sidelink communication on the subchannel in the symbol subsequent to the gap symbol may be canceled. For example, in a case in which a sidelink communication is scheduled to be transmitted from the first UE 120-1 (e.g., the Tx UE) to the second UE 120-2 (e.g., the Rx UE) on an overlapping frequency in the symbol subsequent to the gap symbol, the first UE 120-1 may cancel the transmission of the scheduled sidelink communication. In this case, the first UE 120-1 may transmit, to the second UE 120-2, a PI that indicates, to the second UE 120-2 the cancellation of the scheduled sidelink communication. In some aspects, the PI may include scheduling information that schedules a re-transmission of the canceled sidelink communication. For example, the PI may indicate a deferred resource for re-transmitting the canceled sidelink communication. In some aspects, the second UE 120-2 (e.g., the Rx UE), based at least in part on receiving the SLCI from the base station 110 or from first UE 120-1 or based at least in part on receiving the PI from the first UE 120-1, may cancel monitoring for the scheduled sidelink communication. In this case, the second UE 120-2 may monitor for and receive the re-transmission of the sidelink communication in the deferred resource indicated in the PI.

In some aspects, based at least in part on the set of resources overlapping with the gap symbol, the first UE 120-1 and/or the second UE 120-2 may cancel sidelink transmission (and/or reception) on the one or more overlapping frequencies in the symbol (e.g., a first symbol) preceding the gap symbol and in the symbol (e.g., a second symbol) subsequent to the gap symbol. This may reduce interference, due to imperfect synchronization between sidelink and uplink signals, for an uplink transmission transmitted using a resource that overlaps with the gap symbol. In some aspects, the SLCI may include an indication to cancel sidelink transmissions on the one or more overlapping frequencies in the first symbol preceding the gap symbol, in the second symbol subsequent to the gap symbol, in both the first symbol and the second symbol, or in neither of the first symbol nor the second symbol. In this case, the first UE 120-1 and/or the second UE 120-2 may cancel sidelink transmission (and/or reception) on the one or more overlapping frequencies in the first symbol preceding the gap symbol, in the second symbol subsequent to the gap symbol, in both the first symbol and the second symbol, or in neither the first symbol nor the second symbol based at least in part on the indication in the SLCI.

As further shown in FIG. 8, and by reference number 815, the base station 110 may transmit, to the third UE 120-3 DCI that schedules a sidelink (e.g., PSSCH) communication or an uplink (e.g., PUSCH) communication to be transmitted by the third UE 120-3. The DCI may allocate one or more resources in the set of resources identified in the SLCI for the third UE 120-3 to use to transmit the PSSCH communication or the PUSCH communication. In this case, the third UE 120-3 may be a high priority (e.g., URLLC) UE, and the first UE 120-1 and the second UE 120-2 may be low priority (e.g., eMBB) UEs.

As further shown in FIG. 8, and by reference number 820, the third UE 120-3 may transmit the sidelink (e.g., PSSCH)

communication or the uplink (e.g., PUSCH) communication scheduled by the DCI received from the base station 110. For example, the third UE 120-3 may transmit the PSSCH communication or the PUSCH communication using the resources allocated by the DCI, including one or more resources in the set of resources identified in the SLCI.

As described above, the base station 110 may transmit, to the first UE 120-1 and/or the second UE 120-2, an SLCI that indicates a set of resources in which to cancel sidelink communications. The set of resources, indicated by the SLCI, may overlap with a gap symbol. The first UE 120-1 and/or the second UE 120-2 may receive the SLCI, and the first UE 120-1 and/or the second UE 120-2 may perform one or more sidelink cancellation actions associated with the PSFCH. As a result, the behavior of the UEs regarding which resources are to be canceled may be consistent in a case in which the set of resources indicated by the SLCI overlaps with a configured gap symbol in a sidelink frame structure. This may reduce interference, increase reliability for sidelink communications, an improve latency for high priority (e.g., URLLC) sidelink and/or uplink communications.

As indicated above, FIG. 8 is provided as an example. Other examples may differ from what is described with respect to FIG. 8.

Figure 9:
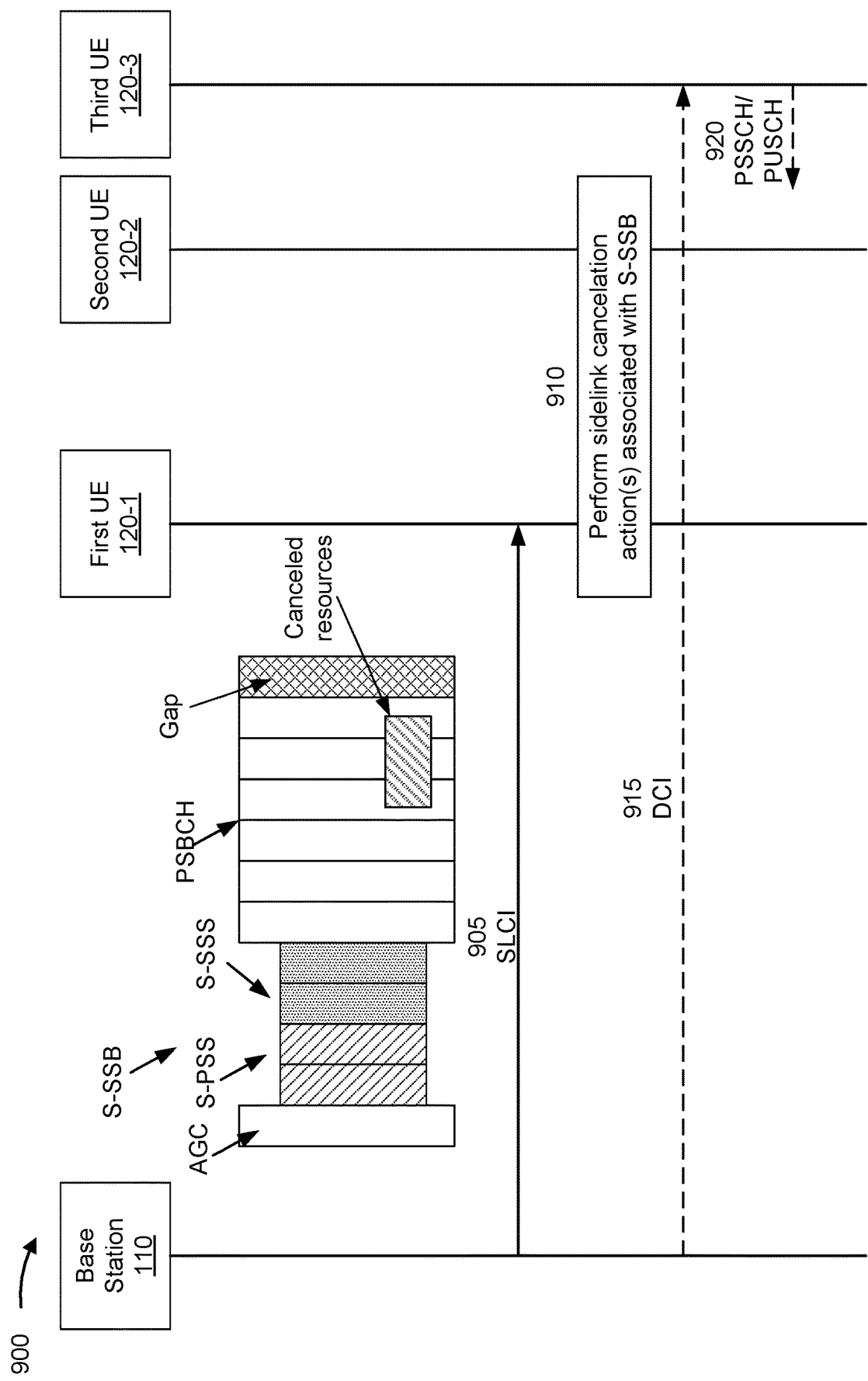
FIG. 9 is a diagram illustrating an example associated with cancellation of sidelink resources in a sidelink synchronization signal block (S-SSB), in accordance with the present disclosure.

FIG. 9 is a diagram illustrating an example 900 associated with cancellation of sidelink resources in a gap symbol, in accordance with the present disclosure. As shown in FIG. 9, example 900 includes communication between a base station 110, a first UE 120-1, a second UE 120-2, and a third UE 120-3. In some aspects, the base station 110, the first UE 120-1, the second UE 120-2, and the third UE 120-3 may be included in a wireless network, such as wireless network 100. The base station 110 and the UEs 120 may communicate via a wireless access link, which may include an uplink and a downlink (e.g., between the base station 110 and the UEs 120) and may include a sidelink (e.g., between the UEs 120).

As shown in FIG. 9, and by reference number 905, the base station 110 may transmit an SLCI to the first UE 120-1. In some aspects, the base station 110 may transmit the SLCI to the first UE 120-1 and one or more other UEs (e.g., the second UE 120-2, the third UE 120-3, and/or one or more other UEs in a coverage range of the base station 110). In some aspects, the base station 110 may include the SLCI in DCI transmitted in a PDCCH communication, such as a GC-PDCCH communication. The SLCI may indicate a set of resources in which to cancel sidelink communications. In some aspects, the SLCI may include a sequence of bits (e.g., 14 bits) that maps to a two-dimensional bit field to indicate a pattern of resources to be canceled, within a time and frequency resource region (e.g., groups of RBs at one or more different frequencies) represented by the two-dimensional bit field. The time and frequency resource region represented by the two-dimensional bit field (e.g., the time and frequency resource region, from which the set of resources to be canceled are selected) may be offset from the SLCI by a time offset value. For example, a first symbol of the time and frequency resource region may be offset from a last symbol of the DCI including the SLCI by the time offset value. In some aspects, the base station 110 may select the set of resources for which sidelink communications are to be canceled based at least in part on an arrival of high priority (e.g., URLLC) traffic in a buffer of a UE (e.g., the third UE 120-3).

As shown in FIG. 9, in some aspects, the set of resources for which sidelink communications are to be canceled may overlap with a scheduled S-SSB to be transmitted by a Tx UE (e.g., the first UE 120-1). For example, at least one resource in the set of resources may overlap with at least one resource for the S-SSB. As shown in FIG. 9, an S-SSB may include a sidelink primary synchronization signal (S-PSS) (e.g., 2 symbols), a sidelink secondary synchronization signal (S-SSS) (e.g., 2 symbols), a PSBCH (e.g., 7 symbols), and a gap symbol. A first symbol of the PSBCH (e.g., prior to the S-PSS and the S-SSS) may be an AGC symbol.

The first UE 120-1 may receive the SLCI from the base station 110. In some aspects, the first UE 120-1 may transmit the SLCI to the second UE 120-2. For example, the first UE 120-1 may transmit the SLCI to the second UE 120-2 in a case in which the second UE 120-2 is out of coverage (e.g., not within the coverage range) of the base station 110. In some aspects, the first UE 120-1 may broadcast the SLCI to one or more other UEs. For example, the first UE 120-1 may broadcast the SLCI (e.g., in SCI) to all sidelink UEs within a range of the first UE 120-1. In some aspects, the second UE 120-2 may be in the coverage range of the base station 110, and the second UE 120-2 may receive the SLCI from the base station 110. In some aspects, the second UE 120-2 may be out of coverage of the base station 110, and the second UE 120-2 may receive the SLCI from the first UE 120-1.

As further shown in FIG. 9, and by reference number 910, the first UE 120-1 and the second UE 120-2 may each perform one or more sidelink cancellation actions associated with the S-SSB.

In some aspects, based at least in part on the set of resources overlapping with the S-SSB, the first UE 120-1 and the second UE 120-2 may ignore the SLCI for one or more resources, in the set of resources, that overlap with the S-SSB. For example, the base station 110 may not be permitted to cancel sidelink communications on any resources included in the S-SSB (e.g., the S-PSS, the S-SSS, and the PSBCH). In this case, the first UE 120-1 (e.g., the Tx UE) may transmit, to the second UE 120-2, the scheduled sidelink communications in the resources included in the S-SSB, even if one or more of the resources included in the S-SSB overlap with the set of resources identified in the SLCI.

In some aspects, based at least in part on the set of resources overlapping with the S-SSB, the Tx UE (e.g., the first UE 120-1) may ignore the SLCI for one or more resources, in the set of resources, that overlap with the S-PSS, the S-SSS, or the AGC symbol (e.g., the first symbol of the PSBCH), and the Tx UE (e.g., the first UE 120-1) may cancel sidelink transmission in one or more resources, in the set of resources, that overlap with one or more PSBCH symbols other than the AGC symbol. For example, in a case in which the set of resources overlaps with one or more PSBCH resources on PSBCH symbols, other than the AGC symbol, the first UE 120-1 may cancel the scheduled sidelink transmission (e.g., PSBCH transmission) in the one or more PSBCH resources that overlap with the set of resource indicated in the SLCI. In this case, the first UE 120-1 may transmit, to the second UE 120-2, a PI that indicates, to the second UE 120-2 (and/or other UEs that may be monitoring for the scheduled PSBCH transmission) the cancellation of the scheduled PSBCH transmission. In some aspects, the PI may include scheduling information that schedules a retransmission of the canceled sidelink communication (e.g., the canceled PSBCH transmission). For example, the PI may indicate a deferred resource for re-transmitting the canceled sidelink communication. In some aspects, the second UE 120-2 (e.g., the Rx UE), based at least in part on receiving the SLCI from the base station 110 or from first UE 120-1 or based at least in part on receiving the PI from the first UE 120-1, may cancel monitoring for the scheduled sidelink communication. In this case, the second UE 120-2 may monitor for and receive the re-transmission of the sidelink communication in the deferred resource indicated in the PI.

In some aspects, based at least in part on the set of resources overlapping with the S-SSB, the Tx UE (e.g., the first UE 120-1) may selectively cancel sidelink transmission or ignore the SLCI for one or more resources, of the set of resources, that overlap with the PSBCH based at least in part on a cyclic prefix (CP) associated with the PSBCH. For example, the first UE 120-1 may cancel sidelink transmission in the PSBCH resources indicated in the SLCI based at least in part on the CP associated with the PSBCH being a normal CP (NCP) (e.g., having an NCP length), and the first UE 120-1 may ignore the SLCI for the PSBCH resources indicated in the SLCI based at least in part on the CP associated with the PSBCH being an extended CP (ECP) (e.g., having an ECP length). In a case in which the first UE 120-1 cancels the scheduled sidelink transmission (e.g., PSBCH transmission) in one or more PSBCH resources, the first UE 120-1 may transmit, to the second UE 120-2 (and/or one or more other UEs) a PI that indicates the cancellation of the PSBCH transmission and/or includes scheduling information for a re-transmission of the canceled PSBCH transmission.

In some aspects, based at least in part on the set of resources overlapping with the S-SSB, the Tx UE (e.g., the first UE 120-1) may cancel sidelink transmission in one or more resources, in the set of resources, that overlap with the PSBCH, the S-PSS, and/or, the S-SSS based at least in part on a number of repetitions configured for the S-SSB satisfying a threshold. For example, the number of repetitions may be a configured number of repetitions of the S-SSB within a frame. In a case in which the configured number of repetitions for the S-SSB satisfies the threshold, the first UE 120-1 may cancel the scheduled sidelink transmission (e.g., PSBCH, S-PSS, and/or S-SSS transmission) in the one or more resources. In this case, the first UE 120-1 may transmit, to the second UE 120-2 (and/or one or more other UEs), a PI that indicates the cancellation of the scheduled sidelink transmission (e.g., PSBCH, S-PSS, and/or S-SSS transmission) and/or includes scheduling information for a re-transmission of the canceled sidelink transmission (e.g., PSBCH, S-PSS, and/or S-SSS transmission).

As further shown in FIG. 9, and by reference number 915, the base station 110 may transmit, to the third UE 120-3 DCI that schedules a sidelink (e.g., PSSCH) communication or an uplink (e.g., PUSCH) communication to be transmitted by the third UE 120-3. The DCI may allocate one or more resources in the set of resources identified in the SLCI for the third UE 120-3 to use to transmit the PSSCH communication or the PUSCH communication. In this case, the third UE 120-3 may be a high priority (e.g., URLLC) UE, and the first UE 120-1 and the second UE 120-2 may be low priority (e.g., eMBB) UEs.

As further shown in FIG. 9, and by reference number 920, the third UE 120-3 may transmit the sidelink (e.g., PSSCH) communication or the uplink (e.g., PUSCH) communication scheduled by the DCI received from the base station 110. For example, the third UE 120-3 may transmit the PSSCH communication or the PUSCH communication using the resources allocated by the DCI, including one or more resources in the set of resources identified in the SLCI.

As described above, the base station 110 may transmit, to the first UE 120-1 and/or the second UE 120-2, an SLCI that indicates a set of resources in which to cancel sidelink communications. The set of resources, indicated by the SLCI, may overlap with a scheduled S-SSB. The first UE 120-1 and/or the second UE 120-2 may receive the SLCI, and the first UE 120-1 and/or the second UE 120-2 may perform one or more sidelink cancellation actions associated with the S-SSB. As a result, the behavior of the UEs regarding which resources are to be canceled may be consistent in a case in which the set of resources indicated by the SLCI overlaps with a scheduled S-SSB. This may reduce interference, increase reliability for sidelink communications, an improve latency for high priority (e.g., URLLC) sidelink and/or uplink communications.

As indicated above, FIG. 9 is provided as an example. Other examples may differ from what is described with respect to FIG. 9.

Figure 10:
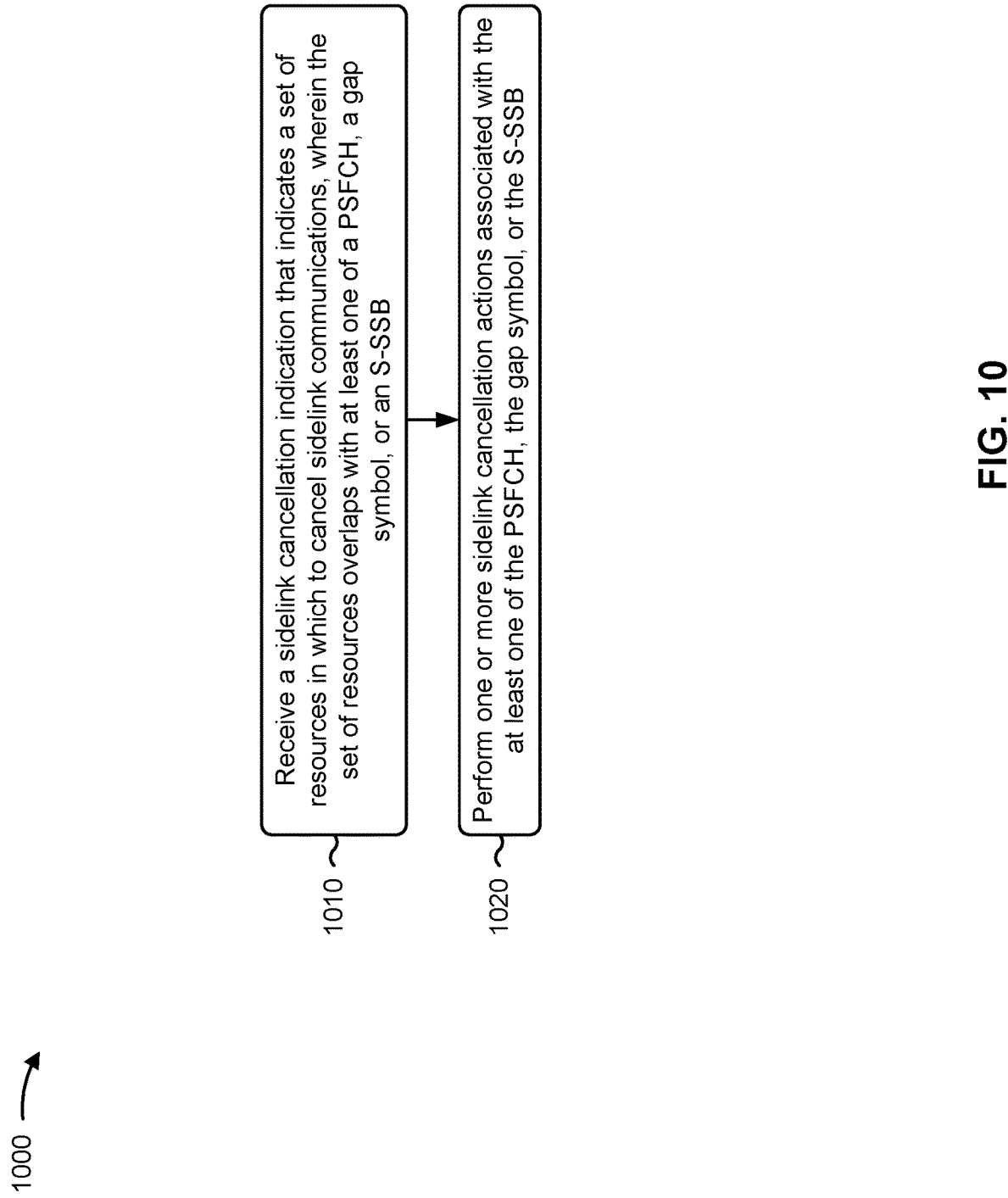
FIGS. 10-11 are diagrams illustrating an example processes associated with cancellation of different sidelink channels, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with cancellation of different sidelink channels.

As shown in FIG. 10, in some aspects, process 1000 may include receiving a sidelink cancellation indication that indicates a set of resources in which to cancel sidelink communications, wherein the set of resources overlaps with at least one of a PSFCH, a gap symbol, or an S-SSB (block 1010). For example, the UE (e.g., using communication manager 140 and/or reception component 1202, depicted in FIG. 12) may receive a sidelink cancellation indication that indicates a set of resources in which to cancel sidelink communications, wherein the set of resources overlaps with at least one of a PSFCH, a gap symbol, or an S-SSB, as described above.

As further shown in FIG. 10, in some aspects, process 1000 may include performing one or more sidelink cancellation actions associated with the at least one of the PSFCH, the gap symbol, or the S-SSB (block 1020). For example, the UE (e.g., using communication manager 140 and/or cancellation component 1208, depicted in FIG. 12) may perform one or more sidelink cancellation actions associated with the at least one of the PSFCH, the gap symbol, or the S-SSB, as described above.

Process 1000 may include additional aspects, such as any single aspect or any combination of aspects described below and/or in connection with one or more other processes described elsewhere herein.

In a first aspect, the set of resources overlaps with the PSFCH.

In a second aspect, alone or in combination with the first aspect, performing the one or more sidelink cancellation actions includes, based at least in part on the set of resources overlapping with the PSFCH deferring transmission of a HARQ feedback message scheduled for the PSFCH to a next available occurrence of the PSFCH.

In a third aspect, alone or in combination with one or more of the first and second aspects, the HARQ feedback message is associated with a sidelink communication received from another UE, and the one or more sidelink cancellation actions further includes receiving, from the other UE that transmitted sidelink communication to the UE, a preemption indication that indicates to defer the transmission of the HARQ feedback message to the next available occurrence of the PSFCH.

In a fourth aspect, alone or in combination with one or more of the first through third aspects, performing the one or more sidelink cancellation actions includes, based at least in part on the set of resources overlapping with the PSFCH deferring monitoring for a HARQ feedback message scheduled for the PSFCH to a next available occurrence of the PSFCH, and transmitting, to another UE, a preemption indication that indicates to defer transmission of the HARQ feedback message scheduled for the PSFCH to the next available occurrence of the PSFCH.

In a fifth aspect, alone or in combination with one or more of the first through fourth aspects, performing the one or more sidelink cancellation actions includes, based at least in part on the set of resources overlapping with the PSFCH ignoring the sidelink cancellation indication for one or more resources, in the set of resources, that overlap with the PSFCH.

In a sixth aspect, alone or in combination with one or more of the first through fifth aspects, performing the one or more sidelink cancellation actions includes, based at least in part on the set of resources overlapping with a first symbol of the PSFCH transmitting or receiving a HARQ feedback message on a second symbol of the PSFCH, and the set of resources does not overlap with the second symbol of the PSFCH.

In a seventh aspect, alone or in combination with one or more of the first through sixth aspects, process 1000 includes broadcasting the sidelink cancellation indication to one or more other UEs.

In an eighth aspect, alone or in combination with one or more of the first through seventh aspects, receiving the sidelink cancellation indication includes receiving the sidelink cancellation indication from a base station or from another UE.

In a ninth aspect, alone or in combination with one or more of the first through eighth aspects, the set of resources overlaps with the gap symbol.

In a tenth aspect, alone or in combination with one or more of the first through ninth aspects, performing the one or more sidelink cancellation actions includes, based at least in part on the set of resources overlapping with the gap symbol ignoring the sidelink cancellation indication for one or more resources, in the set of resources, that overlap with the gap symbol.

In an eleventh aspect, alone or in combination with one or more of the first through tenth aspects, the set of resources overlaps with the gap symbol on one or more overlapping frequencies, and performing the one or more sidelink cancellation actions includes, based at least in part on the set of resources overlapping with the gap symbol canceling sidelink transmission or reception on the one or more overlapping frequencies in a symbol preceding the gap symbol.

In a twelfth aspect, alone or in combination with one or more of the first through eleventh aspects, the set of resources overlaps with the gap symbol on one or more overlapping frequencies, and performing the one or more sidelink cancellation actions includes, based at least in part on the set of resources overlapping with the gap symbol canceling sidelink transmission or reception on the one or more overlapping frequencies in a symbol subsequent to the gap symbol.

In a thirteenth aspect, alone or in combination with one or more of the first through twelfth aspects, the set of resources overlaps with the gap symbol on one or more overlapping frequencies, and performing the one or more sidelink cancellation actions includes, based at least in part on the set of resources overlapping with the gap symbol canceling sidelink transmission or reception on the one or more overlapping frequencies in a first symbol preceding the gap symbol and a second symbol subsequent to the gap symbol.

In a fourteenth aspect, alone or in combination with one or more of the first through thirteenth aspects, the set of resources overlaps with the gap symbol on one or more overlapping frequencies, the sidelink cancellation indication includes an indication to cancel sidelink transmissions on the one or more overlapping frequencies in at least one of a first symbol preceding the gap symbol or a second symbol subsequent to the gap symbol, and performing the one or more sidelink cancellation actions includes, based at least in part on the set of resources overlapping with the gap symbol canceling sidelink transmission or reception on the one or more overlapping frequencies in the at least one of the first symbol preceding the gap symbol and the second symbol subsequent to the gap symbol based at least in part on the sidelink cancellation indication.

In a fifteenth aspect, alone or in combination with one or more of the first through fourteenth aspects, the set of resources overlaps with the S-SSB.

In a sixteenth aspect, alone or in combination with one or more of the first through fifteenth aspects, performing the one or more sidelink cancellation actions includes, based at least in part on the set of resources overlapping with the S-SSB ignoring the sidelink cancellation indication for one or more resources, in the set of resources, that overlap with the S-SSB.

In a seventeenth aspect, alone or in combination with one or more of the first through sixteenth aspects, performing the one or more sidelink cancellation actions includes, based at least in part on the set of resources overlapping with the S-SSB ignoring the sidelink cancellation indication for one or more resources, in the set of resources, that overlap with a sidelink primary synchronization signal in the S-SSB, a sidelink secondary synchronization signal in the S-SSB, or an AGC symbol of a PSBCH in the S-SSB, and canceling sidelink transmission or reception in one or more resources, in the set of resources, that overlap with one or more symbols of the PSBCH, other than the AGC symbol of the PSBCH.

In an eighteenth aspect, alone or in combination with one or more of the first through seventeenth aspects, performing the one or more sidelink cancellation actions includes, based at least in part on the set of resources overlapping with the S-SSB selectively canceling sidelink transmission or ignoring the sidelink cancellation indication for one or more resources, in the set of resources, that overlap with a PSBCH in the S-SSB based at least in part on a cyclic prefix associated with the PSBCH.

In a nineteenth aspect, alone or in combination with one or more of the first through eighteenth aspects, selectively canceling sidelink transmission or ignoring the sidelink cancellation indication for the one or more resources, in the set of resources, that overlap with the PSBCH includes canceling sidelink transmission in the one or more resources, in the set of resources, that overlap with the PSBCH based at least in part on the PSBCH being associated with an NCP, or ignoring the sidelink cancellation indication for the one or more resources, in the set of resources, that overlap with the PSBCH based at least in part on the PSBCH being associated with an ECP.

In a twentieth aspect, alone or in combination with one or more of the first through nineteenth aspects, performing the one or more sidelink cancellation actions includes, based at least in part on the set of resources overlapping with the S-SSB canceling sidelink transmission or reception in one or more resources, in the set of resources, that overlap with at least one of a PSBCH in the S-SSB, a sidelink primary synchronization signal in the S-SSB, or a sidelink secondary synchronization signal in the S-SSB based at least in part on a number of repetitions configured for the S-SSB satisfying a threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
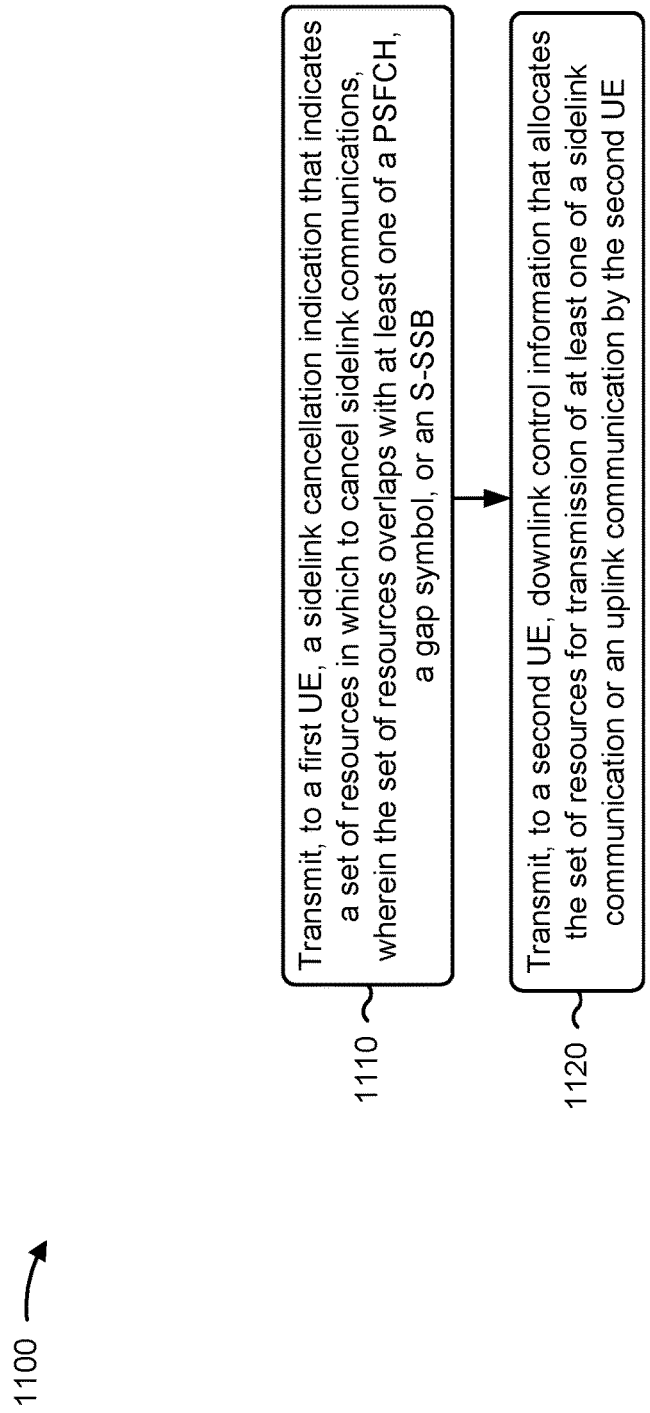

FIG. 11 is a diagram illustrating an example process 1100 performed, for example, by a base station, in accordance with the present disclosure. Example process 1100 is an example where the base station (e.g., base station 110) performs operations associated with cancellation of different sidelink channels.

As shown in FIG. 11, in some aspects, process 1100 may include transmitting, to a first UE, a sidelink cancellation indication that indicates a set of resources in which to cancel sidelink communications, wherein the set of resources overlaps with at least one of a PSFCH, a gap symbol, or an S-SSB (block 1110). For example, the base station (e.g., using communication manager 150 and/or transmission component 1304, depicted in FIG. 13) may transmit, to a first UE, a sidelink cancellation indication that indicates a set of resources in which to cancel sidelink communications, wherein the set of resources overlaps with at least one of a PSFCH, a gap symbol, or an S-SSB, as described above.

As further shown in FIG. 11, in some aspects, process 1100 may include transmitting, to a second UE, downlink control information that allocates the set of resources for transmission of at least one of a sidelink communication or an uplink communication by the second UE (block 1120). For example, the base station (e.g., using communication manager 150 and/or transmission component 1304, depicted in FIG. 13) may transmit, to a second UE, downlink control information that allocates the set of resources for transmission of at least one of a sidelink communication or an uplink communication by the second UE, as described above.

Process 1100 may include additional aspects, such as any single aspect or any combination of aspects described below and/or in connection with one or more other processes described elsewhere herein.

In a first aspect, the set of resources overlaps with the PSFCH.

In a second aspect, alone or in combination with the first aspect, the sidelink cancellation indication causes the first UE to defer transmission of a HARQ feedback message scheduled for the PSFCH to a next available occurrence of the PSFCH.

In a third aspect, alone or in combination with one or more of the first and second aspects, the sidelink cancellation indication causes the first UE to defer monitoring for a HARQ feedback message scheduled for the PSFCH to a next available occurrence of the PSFCH, and causes the first UE to transmit, to a third UE, an indication to defer transmission of the HARQ feedback message scheduled for the PSFCH to the next available occurrence of the PSFCH.

In a fourth aspect, alone or in combination with one or more of the first through third aspects, the set of resources overlaps with a first symbol of the PSFCH, and the set of resources does not overlap with the second symbol of the PSFCH.

In a fifth aspect, alone or in combination with one or more of the first through fourth aspects, the set of resources overlaps with the gap symbol.

In a sixth aspect, alone or in combination with one or more of the first through fifth aspects, the set of resources overlaps with the gap symbol on one or more overlapping frequencies, and the sidelink cancellation indication causes the first UE to cancel sidelink transmission or reception on the one or more overlapping frequencies in at least one of a symbol preceding the gap symbol or a symbol subsequent to the gap symbol.

In a seventh aspect, alone or in combination with one or more of the first through sixth aspects, the set of resources overlaps with the gap symbol on one or more overlapping frequencies, and the sidelink cancellation indication includes an indication to cancel sidelink transmissions on the one or more overlapping frequencies in at least one of a first symbol preceding the gap symbol or a second symbol subsequent to the gap symbol.

In an eighth aspect, alone or in combination with one or more of the first through seventh aspects, the set of resources overlaps with the S-SSB.

In a ninth aspect, alone or in combination with one or more of the first through eighth aspects, the set of resources overlaps one or more symbols of a PSBCH in the S-SSB, and the set of resources does not overlap with a sidelink primary synchronization signal in the S-SSB, a sidelink secondary synchronization signal in the S-SSB, or an AGC symbol of the PSBCH.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
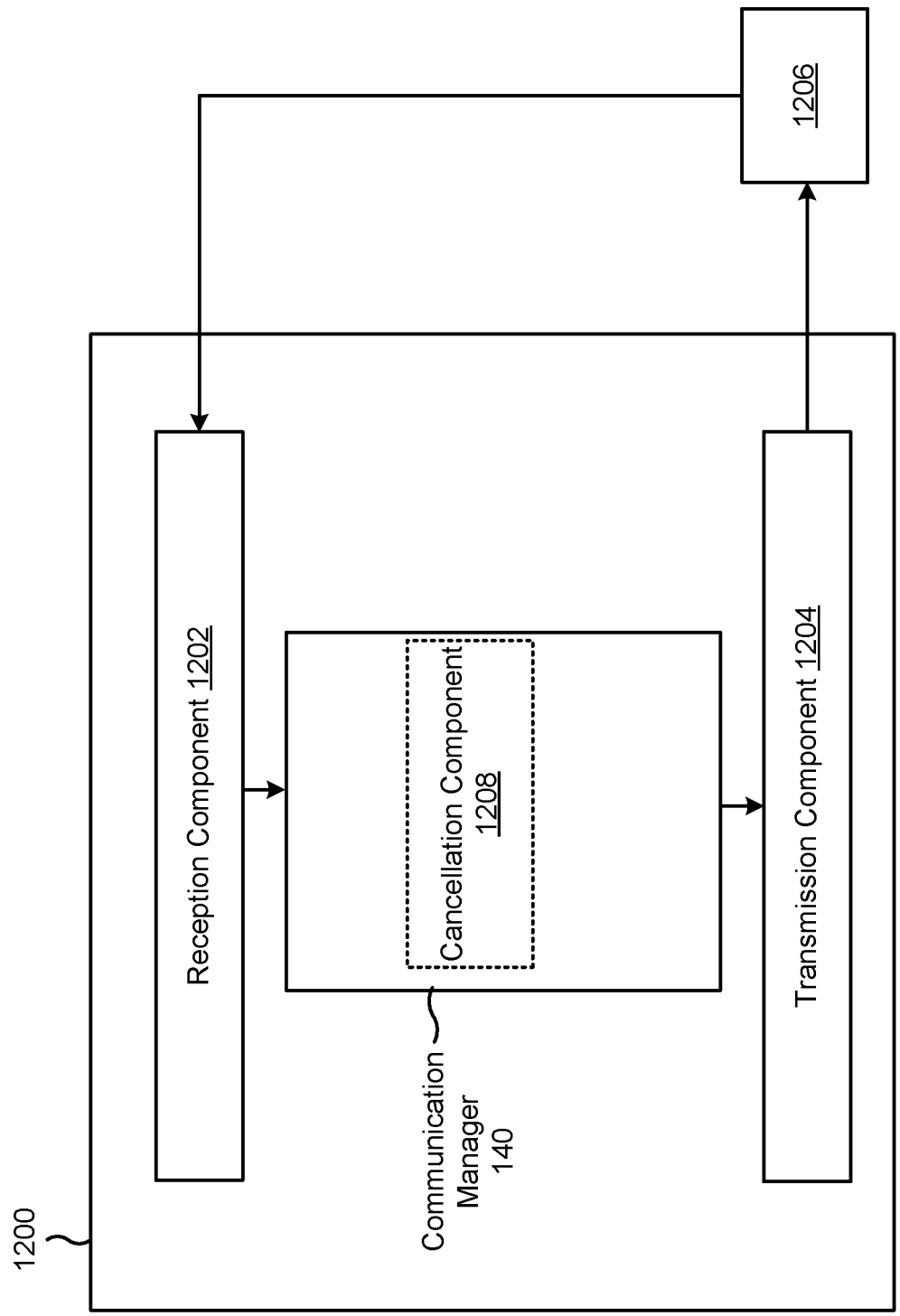
FIGS. 12-13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a cancellation component 1208, among other examples.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples) and may provide the processed signals to the one or more other components of the apparatus 1206. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples) and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a sidelink cancellation indication that indicates a set of resources in which to cancel sidelink communications, wherein the set of resources overlaps with at least one of a PSFCH, a gap symbol, or an S-SSB. The cancellation component 1208 may perform one or more sidelink cancellation actions associated with the at least one of the PSFCH, the gap symbol, or the S-SSB.

The transmission component 1204 may broadcast the sidelink cancellation indication to one or more other UEs.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
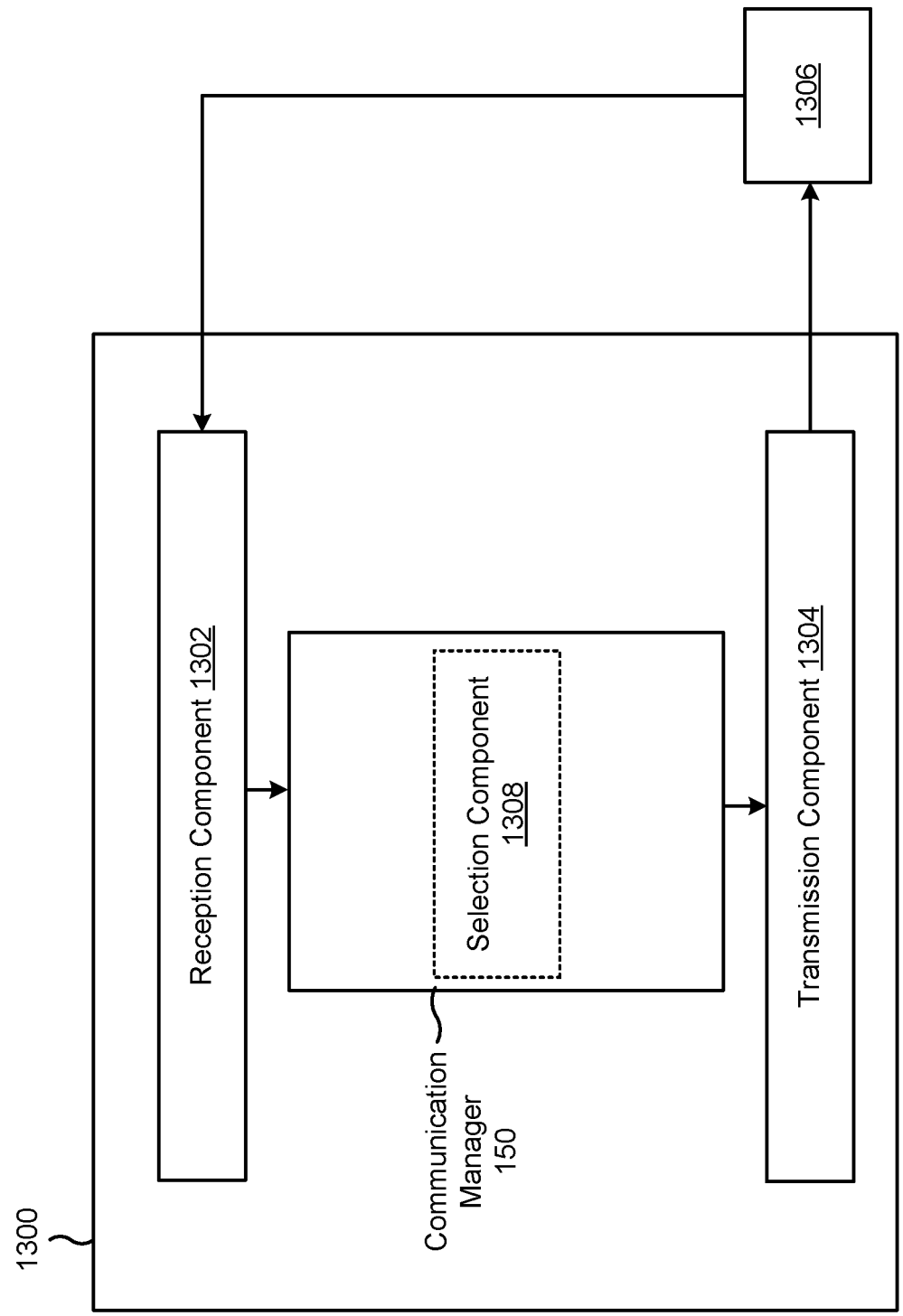

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a selection component 1308, among other examples.

In some aspects, the apparatus 1300 may be configured to perform one or more operations described herein in connection with FIGS. 7-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples) and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples) and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The transmission component 1304 may transmit, to a first UE, a sidelink cancellation indication that indicates a set of resources in which to cancel sidelink communications, wherein the set of resources overlaps with at least one of a PSFCH, a gap symbol, or an S-SSB. The transmission component 1304 may transmit, to a second UE, downlink control information that allocates the set of resources for transmission of at least one of a sidelink communication or an uplink communication by the second UE.

The selection component 1308 may select the set of resources indicated in the sidelink cancellation indication.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving a sidelink cancellation indication that indicates a set of resources in which to cancel sidelink communications, wherein the set of resources overlaps with at least one of a physical sidelink feedback channel (PSFCH), a gap symbol, or a sidelink synchronization signal block (S-SSB); and performing one or more sidelink cancellation actions associated with the at least one of the PSFCH, the gap symbol, or the S-SSB.

Aspect 2: The method of Aspect 1, wherein the set of resources overlaps with the PSFCH.

Aspect 3: The method of Aspect 2, wherein performing the one or more sidelink cancellation actions comprises, based at least in part on the set of resources overlapping with the PSFCH: deferring transmission of a hybrid automatic repeat request (HARQ) feedback message scheduled for the PSFCH to a next available occurrence of the PSFCH.

Aspect 4: The method of Aspect 3, wherein the HARQ feedback message is associated with a sidelink communication received from another UE, and wherein the performing one or more sidelink cancellation actions further comprises: receiving, from the other UE that transmitted sidelink communication to the UE, a preemption indication that indicates to defer the transmission of the HARQ feedback message to the next available occurrence of the PSFCH.

Aspect 5: The method of Aspect 2, wherein performing the one or more sidelink cancellation actions comprises, based at least in part on the set of resources overlapping with the PSFCH: deferring monitoring for a hybrid automatic repeat request (HARQ) feedback message scheduled for the PSFCH to a next available occurrence of the PSFCH; and transmitting, to another UE, a preemption indication that indicates to defer transmission of the HARQ feedback message scheduled for the PSFCH to the next available occurrence of the PSFCH.

Aspect 6: The method of Aspect 2, wherein performing the one or more sidelink cancellation actions comprises, based at least in part on the set of resources overlapping with the PSFCH: ignoring the sidelink cancellation indication for one or more resources, in the set of resources, that overlap with the PSFCH.

Aspect 7: The method of Aspect 2, wherein performing the one or more sidelink cancellation actions comprises, based at least in part on the set of resources overlapping with a first symbol of the PSFCH: transmitting or receiving a hybrid automatic repeat request (HARQ) feedback message on a second symbol of the PSFCH, wherein the set of resources does not overlap with the second symbol of the PSFCH.

Aspect 8: The method of any of Aspects 1-7, further comprising: broadcasting the sidelink cancellation indication to one or more other UEs.

Aspect 9: The method of any of Aspects 1-8, wherein receiving the sidelink cancellation indication comprises: receiving the sidelink cancellation indication from a base station or from another UE.

Aspect 10: The method of any of Aspects 1-9, wherein the set of resources overlaps with the gap symbol.

Aspect 11: The method of Aspect 10, wherein performing the one or more sidelink cancellation actions comprises, based at least in part on the set of resources overlapping with the gap symbol: ignoring the sidelink cancellation indication for one or more resources, in the set of resources, that overlap with the gap symbol.

Aspect 12: The method of Aspect 10, wherein the set of resources overlaps with the gap symbol on one or more overlapping frequencies, and wherein performing the one or more sidelink cancellation actions comprises, based at least in part on the set of resources overlapping with the gap symbol: cancelling sidelink transmission or reception on the one or more overlapping frequencies in a symbol preceding the gap symbol.

Aspect 13: The method of any of Aspects 10 or 12, wherein the set of resources overlaps with the gap symbol on one or more overlapping frequencies, and wherein performing the one or more sidelink cancellation actions comprises, based at least in part on the set of resources overlapping with the gap symbol: cancelling sidelink transmission or reception on the one or more overlapping frequencies in a symbol subsequent to the gap symbol.

Aspect 14: The method of any of Aspects 10 or 12-13, wherein the set of resources overlaps with the gap symbol on one or more overlapping frequencies, and wherein performing the one or more sidelink cancellation actions comprises, based at least in part on the set of resources overlapping with the gap symbol: cancelling sidelink transmission or reception on the one or more overlapping frequencies in a first symbol preceding the gap symbol and a second symbol subsequent to the gap symbol.

Aspect 15: The method of any of Aspects 10 or 12-14, wherein the set of resources overlaps with the gap symbol on one or more overlapping frequencies, wherein the sidelink cancellation indication includes an indication to cancel sidelink transmissions on the one or more overlapping frequencies in at least one of a first symbol preceding the gap symbol or a second symbol subsequent to the gap symbol, and wherein performing the one or more sidelink cancellation actions comprises, based at least in part on the set of resources overlapping with the gap symbol: cancelling sidelink transmission or reception on the one or more overlapping frequencies in the at least one of the first symbol preceding the gap symbol and the second symbol subsequent to the gap symbol based at least in part on the sidelink cancellation indication.

Aspect 16: The method of any of Aspects 1-15, wherein the set of resources overlaps with the S-SSB.

Aspect 17: The method of Aspect 16, wherein performing the one or more sidelink cancellation actions comprises, based at least in part on the set of resources overlapping with the S-SSB: ignoring the sidelink cancellation indication for one or more resources, in the set of resources, that overlap with the S-SSB.

Aspect 18: The method of Aspect 16, wherein performing the one or more sidelink cancellation actions comprises, based at least in part on the set of resources overlapping with the S-SSB: ignoring the sidelink cancellation indication for one or more resources, in the set of resources, that overlap with a sidelink primary synchronization signal in the S-SSB, a sidelink secondary synchronization signal in the S-SSB, or an automatic gain control (AGC) symbol of a physical sidelink broadcast channel (PSBCH) in the S-SSB; and cancelling sidelink transmission or reception in one or more resources, in the set of resources, that overlap with one or more symbols of the PSBCH, other than the AGC symbol of the PSBCH.

Aspect 19: The method of Aspect 16, wherein performing the one or more sidelink cancellation actions comprises, based at least in part on the set of resources overlapping with the S-SSB: selectively canceling sidelink transmission or ignoring the sidelink cancellation indication for one or more resources, in the set of resources, that overlap with a physical sidelink broadcast channel (PSBCH) in the S-SSB based at least in part on a cyclic prefix associated with the PSBCH.

Aspect 20: The method of Aspect 19, wherein selectively canceling sidelink transmission or ignoring the sidelink cancellation indication for the one or more resources, in the set of resources, that overlap with the PSBCH comprises: canceling sidelink transmission in the one or more resources, in the set of resources, that overlap with the PSBCH based at least in part on the PSBCH being associated with a normal cyclic prefix (NCP); or ignoring the sidelink cancellation indication for the one or more resources, in the set of resources, that overlap with the PSBCH based at least in part on the PSBCH being associated with an extended cyclic prefix (ECP).

Aspect 21: The method of Aspect 16, wherein performing the one or more sidelink cancellation actions comprises, based at least in part on the set of resources overlapping with the S-SSB: cancelling sidelink transmission or reception in one or more resources, in the set of resources, that overlap with at least one of a physical sidelink broadcast channel (PSBCH) in the S-SSB, a sidelink primary synchronization signal in the S-SSB, or a sidelink secondary synchronization signal in the S-SSB based at least in part on a number of repetitions configured for the S-SSB satisfying a threshold.

Aspect 22: A method of wireless communication performed by a base station, comprising: transmitting, to a first user equipment (UE), a sidelink cancellation indication that indicates a set of resources in which to cancel sidelink communications, wherein the set of resources overlaps with at least one of a physical sidelink feedback channel (PSFCH), a gap symbol, or a sidelink synchronization signal block (S-SSB); and transmitting, to a second UE, downlink control information that allocates the set of resources for transmission of at least one of a sidelink communication or an uplink communication by the second UE.

Aspect 23: The method of Aspect 22, wherein the set of resources overlaps with the PSFCH.

Aspect 24: The method of Aspect 23, wherein the sidelink cancellation indication causes the first UE to defer transmission of a hybrid automatic repeat request (HARQ) feedback message scheduled for the PSFCH to a next available occurrence of the PSFCH.

Aspect 25: The method of Aspect 23, wherein the sidelink cancellation indication causes the first UE to defer monitoring for a hybrid automatic repeat request (HARQ) feedback message scheduled for the PSFCH to a next available occurrence of the PSFCH, and causes the first UE to transmit, to a third UE, an indication to defer transmission of the HARQ feedback message scheduled for the PSFCH to the next available occurrence of the PSFCH.

Aspect 26: The method of Aspect 23, wherein the set of resources overlaps with a first symbol of the PSFCH, and wherein the set of resources does not overlap with the second symbol of the PSFCH.

Aspect 27: The method of any of Aspects 22-26, wherein the set of resources overlaps with the gap symbol.

Aspect 28: The method of Aspect 27, wherein the set of resources overlaps with the gap symbol on one or more overlapping frequencies, and wherein the sidelink cancellation indication causes the first UE to cancel sidelink transmission or reception on the one or more overlapping frequencies in at least one of a symbol preceding the gap symbol or a symbol subsequent to the gap symbol.

Aspect 29: The method of any of Aspects 27-28, wherein the set of resources overlaps with the gap symbol on one or more overlapping frequencies, and wherein the sidelink cancellation indication includes an indication to cancel sidelink transmissions on the one or more overlapping frequencies in at least one of a first symbol preceding the gap symbol or a second symbol subsequent to the gap symbol.

Aspect 30: The method of any of Aspects 22-29, wherein the set of resources overlaps with the S-SSB.

Aspect 31: The method of Aspect 30, wherein the set of resources overlaps one or more symbols of a physical sidelink broadcast channel (PSBCH) in the S-SSB, and wherein the set of resources does not overlap with a sidelink primary synchronization signal in the S-SSB, a sidelink secondary synchronization signal in the S-SSB, or an automatic gain control (AGC) symbol of the PSBCH.

Aspect 32: An apparatus for wireless communication at a device, comprising a processor; memory coupled with the processor; and instructions stored in the memory and executable by the processor to cause the apparatus to perform the method of one or more of Aspects 1-21.

Aspect 33: An apparatus for wireless communication at a device, comprising a processor; memory coupled with the processor; and instructions stored in the memory and executable by the processor to cause the apparatus to perform the method of one or more of Aspects 22-31.

Aspect 34: A device for wireless communication, comprising a memory and one or more processors coupled to the memory, the one or more processors configured to perform the method of one or more of Aspects 1-21.

Aspect 35: A device for wireless communication, comprising a memory and one or more processors coupled to the memory, the one or more processors configured to perform the method of one or more of Aspects 22-31.

Aspect 36: An apparatus for wireless communication, comprising at least one means for performing the method of one or more of Aspects 1-21.

Aspect 37: An apparatus for wireless communication, comprising at least one means for performing the method of one or more of Aspects 22-31.

Aspect 38: A non-transitory computer-readable medium storing code for wireless communication, the code comprising instructions executable by a processor to perform the method of one or more of Aspects 1-21.

Aspect 39: A non-transitory computer-readable medium storing code for wireless communication, the code comprising instructions executable by a processor to perform the method of one or more of Aspects 22-31.

Aspect 40: A non-transitory computer-readable medium storing a set of instructions for wireless communication, the set of instructions comprising one or more instructions that, when executed by one or more processors of a device, cause the device to perform the method of one or more of Aspects 1-21.

Aspect 41: A non-transitory computer-readable medium storing a set of instructions for wireless communication, the set of instructions comprising one or more instructions that, when executed by one or more processors of a device, cause the device to perform the method of one or more of Aspects 22-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, based at least in part on information stored in the one or more memories, configured to:
      receive a sidelink cancellation indication that indicates a set of resources that overlap with at least one of a physical sidelink feedback channel (PSFCH), a gap symbol, or a sidelink synchronization signal block (S-SSB), the sidelink cancellation indication indicating to cancel sidelink communications in the set of resources; and
      perform, based on the set of resources indicated by the sidelink cancellation indication overlapping with the PSFCH, one or more sidelink cancellation actions associated with the PSFCH, the one or more sidelink cancellation actions associated with the PSFCH comprising:
         deferring transmission of a hybrid automatic repeat request (HARQ) feedback message scheduled for the PSFCH to a next available occurrence of the PSFCH, or
         deferring monitoring for a HARQ feedback message scheduled for the PSFCH to the next available occurrence of the PSFCH.

2. The apparatus of claim 1, wherein:
   the one or more sidelink cancellation actions associated with the PSFCH comprise deferring transmission of the HARQ feedback message scheduled for the PSFCH to the next available occurrence of the PSFCH;
   the HARQ feedback message is associated with a sidelink communication received from another UE; and
   the one or more processors, to perform the one or more sidelink cancellation actions associated with the PSFCH, are further configured to:
      receive, from the other UE that transmitted sidelink communication to the UE, a preemption indication that indicates to defer the transmission of the HARQ feedback message to the next available occurrence of the PSFCH.

3. The apparatus of claim 1, wherein:
   the one or more sidelink cancellation actions associated with the PSFCH comprise deferring the monitoring for the HARQ feedback message scheduled for the PSFCH to the next available occurrence of the PSFCH; and
   the one or more processors, to perform the one or more sidelink cancellation actions associated with the PSFCH, are configured to:
      transmit, to another UE, a preemption indication that indicates to defer transmission of the HARQ feedback message scheduled for the PSFCH to the next available occurrence of the PSFCH.

4. The apparatus of claim 1, wherein the one or more sidelink cancellation actions associated with the PSFCH further comprise ignoring the sidelink cancellation indication for one or more resources, in the set of resources, that overlap with the PSFCH.

5. The apparatus of claim 1, wherein the one or more sidelink cancellation actions associated with the PSFCH further comprise transmitting or receiving a HARQ feedback message on a second symbol of the PSFCH, wherein the set of resources does not overlap with the second symbol of the PSFCH.

6. The apparatus of claim 1, wherein the one or more processors are further configured to:
   broadcast the sidelink cancellation indication to one or more other UEs.

7. The apparatus of claim 1, wherein the one or more processors, to receive the sidelink cancellation indication, are configured to:
   receive the sidelink cancellation indication from a network entity or from another UE.

8. The apparatus of claim 1, wherein the one or more processors are further configured to:
   receive a second sidelink cancellation indication that indicates a second set of resources that overlaps with the gap symbol.

9. The apparatus of claim 8, wherein:
   the one or more processors are configured to perform one or more second sidelink cancellation actions associated with the gap symbol based at least in part on the second set of resources indicated by the second sidelink cancellation indication overlapping with the gap symbol; and
   the one or more processors, to perform the one or more second sidelink cancellation actions associated with the gap symbol, are configured to:
      ignore the second sidelink cancellation indication for one or more resources, in the second set of resources, that overlap with the gap symbol.

10. The apparatus of claim 8, wherein:
    the one or more processors are configured to perform one or more second sidelink cancellation actions associated with the gap symbol based at least in part on the second set of resources overlapping with the gap symbol on one or more overlapping frequencies; and the one or more processors, to perform the one or more second sidelink cancellation actions associated with the gap symbol, are configured to:
cancel sidelink transmission or reception on the one or more overlapping frequencies in a symbol preceding the gap symbol.

11. The apparatus of claim 8, wherein:
the one or more processors are configured to perform one or more second sidelink cancellation actions associated with the gap symbol based at least in part on the second set of resources overlapping with the gap symbol on one or more overlapping frequencies; and
the one or more processors, to perform the one or more second sidelink cancellation actions associated with the gap symbol, are configured to:
cancel sidelink transmission or reception on the one or more overlapping frequencies in a symbol subsequent to the gap symbol.

12. The apparatus of claim 8, wherein:
the one or more processors are configured to perform one or more second sidelink cancellation actions associated with the gap symbol based at least in part on the second set of resources overlapping with the gap symbol on one or more overlapping frequencies; and
the one or more processors, to perform the one or more second sidelink cancellation actions associated with the gap symbol, are configured to:
cancel sidelink transmission or reception on the one or more overlapping frequencies in a first symbol preceding the gap symbol and a second symbol subsequent to the gap symbol.

13. The apparatus of claim 8, wherein:
the one or more processors are configured to perform one or more second sidelink cancellation actions associated with the gap symbol based at least in part on the second set of resources overlapping with the gap symbol on one or more overlapping frequencies;
the second sidelink cancellation indication includes an indication to cancel sidelink transmissions on the one or more overlapping frequencies in at least one of a first symbol preceding the gap symbol or a second symbol subsequent to the gap symbol; and
the one or more processors, to perform the one or more second sidelink cancellation actions associated with the gap symbol, are configured to:
cancel sidelink transmission or reception on the one or more overlapping frequencies in the at least one of the first symbol preceding the gap symbol and the second symbol subsequent to the gap symbol based at least in part on the second sidelink cancellation indication.

14. The apparatus of claim 1, wherein the one or more processors are further configured to:
receive a second sidelink cancellation indication that indicates a second set of resources that overlaps with the S-SSB.

15. The apparatus of claim 14, wherein:
the one or more processors are configured to perform one or more second sidelink cancellation actions associated with the S-SSB based at least in part on the second set of resources indicated by the second sidelink cancellation indication overlapping with the S-SSB; and
the one or more processors, to perform the one or more second sidelink cancellation actions associated with the S-SSB, are configured to:
ignore the second sidelink cancellation indication for one or more resources, in the second set of resources, that overlap with the S-SSB.

16. The apparatus of claim 14, wherein:
the one or more processors are configured to perform one or more second sidelink cancellation actions associated with the S-SSB based at least in part on the second set of resources indicated by the second sidelink cancellation indication overlapping with the S-SSB; and
the one or more processors, to perform the one or more second sidelink cancellation actions associated with the S-SSB, are configured to:
ignore the second sidelink cancellation indication for one or more resources, in the second set of resources, that overlap with a sidelink primary synchronization signal in the S-SSB, a sidelink secondary synchronization signal in the S-SSB, or an automatic gain control (AGC) symbol of a physical sidelink broadcast channel (PSBCH) in the S-SSB, and
cancel sidelink transmission or reception in one or more resources, in the second set of resources, that overlap with one or more symbols of the PSBCH, other than the AGC symbol of the PSBCH.

17. The apparatus of claim 14, wherein:
the one or more processors are configured to perform one or more second sidelink cancellation actions associated with the S-SSB based at least in part on the second set of resources indicated by the second sidelink cancellation indication overlapping with the S-SSB; and
the one or more processors, to perform the one or more second sidelink cancellation actions associated with the S-SSB, are configured to:
selectively cancel sidelink transmission or ignore the second sidelink cancellation indication for one or more resources, in the second set of resources, that overlap with a physical sidelink broadcast channel (PSBCH) in the S-SSB based at least in part on a cyclic prefix associated with the PSBCH.

18. The apparatus of claim 17, wherein the one or more processors, to selectively cancel sidelink transmission in the one or more resources or ignore the sidelink cancellation indication for the one or more resources, in the second set of resources, that overlap with the PSBCH, are configured to:
cancel sidelink transmission in the one or more resources, in the second set of resources, that overlap with the PSBCH based at least in part on the PSBCH being associated with a normal cyclic prefix (NCP); and
ignore the sidelink cancellation indication for the one or more resources, in the second set of resources, that overlap with the PSBCH based at least in part on the PSBCH being associated with an extended cyclic prefix (ECP).

19. The apparatus of claim 14, wherein:
the one or more processors are configured to perform one or more second sidelink cancellation actions associated with the S-SSB based at least in part on the second set of resources indicated by the second sidelink cancellation indication overlapping with the S-SSB; and
the one or more processors, to perform the one or more second sidelink cancellation actions associated with the S-SSB, are configured to:
cancel sidelink transmission or reception in one or more resources, in the second set of resources, that overlap with at least one of a physical sidelink broadcast channel (PSBCH) in the S-SSB, a sidelink primary synchronization signal in the S-SSB, or a sidelink secondary synchronization signal in the S-SSB based at least in part on a number of repetitions configured for the S-SSB satisfying a threshold.

20. A method of wireless communication performed by a user equipment (UE), comprising:

receiving a sidelink cancellation indication that indicates a set of resources that overlap with at least one of a physical sidelink feedback channel (PSFCH), a gap symbol, or a sidelink synchronization signal block (S-SSB), the sidelink cancellation indication indicating to cancel sidelink communications in the set of resources; and performing, based on the set of resources indicated by the sidelink cancellation indication overlapping with the PSFCH, one or more sidelink cancellation actions associated with the PSFCH, the one or more sidelink cancellation actions associated with the PSFCH comprising:

deferring transmission of a hybrid automatic repeat request (HARQ) feedback message scheduled for the PSFCH to a next available occurrence of the PSFCH, or deferring monitoring for a HARQ feedback message scheduled for the PSFCH to the next available occurrence of the PSFCH.

21. The method of claim 20, wherein the one or more sidelink cancellation actions associated with the PSFCH comprises deferring monitoring for the HARQ feedback message scheduled for the PSFCH to the next available occurrence of the PSFCH, the method further comprising:

transmitting, to another UE, a preemption indication that indicates to defer transmission of the HARQ feedback message scheduled for the PSFCH to the next available occurrence of the PSFCH.

22. The method of claim 20, wherein the method further comprises:

receiving a second sidelink cancellation indication that indicates a second set of resources that overlap with the gap symbol on one or more overlapping frequencies; and performing one or more second sidelink cancellation actions associated with the gap symbol comprising cancelling sidelink transmission or reception on the one or more overlapping frequencies in at least one of a symbol preceding the gap symbol or a symbol subsequent to the gap symbol.

23. The method of claim 20, wherein the method further comprises:

receiving a second sidelink cancellation indication that indicates a second set of resources that overlap with the S-SSB; and performing one or more second sidelink cancellation actions associated with the S-SSB comprising:

ignoring the second sidelink cancellation indication for one or more resources, in the second set of resources, that overlap with a sidelink primary synchronization signal in the S-SSB, a sidelink secondary synchronization signal in the S-SSB, or an automatic gain control (AGC) symbol of a physical sidelink broadcast channel (PSBCH) in the S-SSB, and cancelling sidelink transmission or reception in one or more resources, in the second set of resources, that overlap with one or more symbols of the PSBCH, other than the AGC symbol of the PSBCH.

24. The method of claim 20, wherein the method further comprises:

receiving a second sidelink cancellation indication that indicates a second set of resources that overlap with the S-SSB; and performing one or more second sidelink cancellation actions associated with the S-SSB comprising selectively canceling sidelink transmission or ignoring the sidelink cancellation indication for one or more resources, in the second set of resources, that overlap with a physical sidelink broadcast channel (PSBCH) in the S-SSB based at least in part on a cyclic prefix associated with the PSBCH.

25. The method of claim 20, wherein the method further comprises:

receiving a second sidelink cancellation indication that indicates a second set of resources that overlap with the S-SSB; and performing one or more second sidelink cancellation actions associated with the S-SSB comprising cancelling sidelink transmission or reception in one or more resources, in the second set of resources, that overlap with at least one of a physical sidelink broadcast channel (PSBCH) in the S-SSB, a sidelink primary synchronization signal in the S-SSB, or a sidelink secondary synchronization signal in the S-SSB based at least in part on a number of repetitions configured for the S-SSB satisfying a threshold.

26. The method of claim 20, further comprising:

broadcasting the sidelink cancellation indication to one or more other UEs.

27. The method of claim 20, wherein receiving the sidelink cancellation indication comprises receiving the sidelink cancellation indication from a network entity or from another UE.

28. The method of claim 20, wherein the one or more sidelink cancellation actions associated with the PSFCH further comprise ignoring the sidelink cancellation indication for one or more resources, in the set of resources, that overlap with the PSFCH.

29. A non-transitory computer-readable medium storing a set of instructions for wireless communication, the set of instructions comprising:

one or more instructions that, when executed by one or more processors of a user equipment (UE), cause the UE to:

receive a sidelink cancellation indication that indicates a set of resources that overlap with at least one of a physical sidelink feedback channel (PSFCH), a gap symbol, or a sidelink synchronization signal block (S-SSB), the sidelink cancellation indication indicating to cancel sidelink communications in the set of resources; and perform, based on the set of resources indicated by the sidelink cancellation indication overlapping with the PSFCH, one or more sidelink cancellation actions associated with the PSFCH, the one or more sidelink cancellation actions associated with the PSFCH comprising:

deferring transmission of a hybrid automatic repeat request (HARQ) feedback message scheduled for the PSFCH to a next available occurrence of the PSFCH, or deferring monitoring for a HARQ feedback message scheduled for the PSFCH to the next available occurrence of the PSFCH.

30. An apparatus for wireless communication, comprising:
- means for receiving a sidelink cancellation indication that indicates a set of resources that overlap with at least one of a physical sidelink feedback channel (PSFCH), a gap symbol, or a sidelink synchronization signal block (S-SSB), the sidelink cancellation indication indicating to cancel sidelink communications in the set of resources; and
- means for performing, based on the set of resources indicated by the sidelink cancellation indication overlapping with the PSFCH, one or more sidelink cancellation actions associated with the PSFCH, the one or more sidelink cancellation actions associated with the PSFCH comprising:
  - deferring transmission of a hybrid automatic repeat request (HARQ) feedback message scheduled for the PSFCH to a next available occurrence of the PSFCH, or
  - deferring monitoring for a HARQ feedback message scheduled for the PSFCH to the next available occurrence of the PSFCH.

\* \* \* \* \*